US012406650B2

(12) United States Patent
Chen et al.

(10) Patent No.: US 12,406,650 B2
(45) Date of Patent: Sep. 2, 2025

(54) APPARATUSES AND METHODS FOR IMPROVED NOISE REDUCTION AND VOICE CAPTURE IN RESPIRATORY PROTECTIVE DEVICES

(71) Applicant: HONEYWELL SAFETY PRODUCTS USA, INC., Charlotte, NC (US)

(72) Inventors: En Yi Chen, Charlotte, NC (US); Li Cheng, Charlotte, NC (US); Zhicheng Zou, Charlotte, NC (US)

( * ) Notice: Subject to any disclaimer, the term of this patent is extended or adjusted under 35 U.S.C. 154(b) by 0 days.

(21) Appl. No.: 18/521,371

(22) Filed: Nov. 28, 2023

(65) Prior Publication Data

US 2024/0203393 A1 Jun. 20, 2024

(30) Foreign Application Priority Data

Dec. 19, 2022 (CN) ........................ 202211632361.9

(51) Int. Cl.
*G10K 11/178* (2006.01)

(52) U.S. Cl.
CPC .... *G10K 11/17825* (2018.01); *G10K 11/1785* (2018.01); *G10K 2210/109* (2013.01)

(58) Field of Classification Search
CPC ......... G10K 11/17825; G10K 11/1785; G10K 2210/109
USPC ...................................................... 381/71.11
See application file for complete search history.

(56) References Cited

U.S. PATENT DOCUMENTS

2022/0180850 A1 6/2022 Reid et al.

FOREIGN PATENT DOCUMENTS

| | | | |
|---|---|---|---|
| JP | 2004-185254 | A | 7/2004 |
| KR | 10-2293918 | B1 | 8/2021 |
| KR | 10-2022-0041530 | A | 4/2022 |
| WO | 2021/252478 | A1 | 12/2021 |
| WO | 2022/014894 | A1 | 1/2022 |

OTHER PUBLICATIONS

Extended European Search Report Mailed on May 8, 2024 for EP Application No. 23208168, 8 page(s).

*Primary Examiner* — David L Ton
(74) *Attorney, Agent, or Firm* — Fredrikson & Byron, P.A.

(57) ABSTRACT

Apparatuses and methods for improved noise reduction and voice capture in respiratory protective devices are provided. For example, an example respiratory protective device includes at least one fan component secured to the respiratory protective device, at least one sound sensor component positioned within the respiratory protective device and generating a detected sound signal, and a controller component electronically coupled to the at least one fan component. In some examples, the controller component is configured to receive a detected fan speed signal, retrieve a corresponding noise profile data object, generate a noise-reduced sound signal, and transmit the noise-reduced sound signal to a data communication component.

22 Claims, 21 Drawing Sheets

APPARATUSES AND METHODS FOR IMPROVED NOISE REDUCTION AND VOICE CAPTURE IN RESPIRATORY PROTECTIVE DEVICES

CROSS REFERENCE TO RELATED APPLICATIONS

This application claims priority pursuant to 35 U.S.C. 119(a) to Chinese Application No. 202211632361.9, filed Dec. 19, 2022, which application is incorporated herein by reference in its entirety.

FIELD OF THE INVENTION

Example embodiments of the present disclosure relate generally to respiratory protective devices and, more particularly, to apparatuses and methods for improved noise cancellation and sound capture in respiratory protective devices.

BACKGROUND

Applicant has identified many technical challenges and difficulties associated with masks. For example, when a user wears a mask while conducting a telephone call, noise (for example, noise from one or more fans that are in the mask) may interfere with the voice captured from the user.

BRIEF SUMMARY

Various embodiments described herein relate to methods, apparatuses, and systems for improved noise cancellation and sound capture in respiratory protective devices.

In accordance with various embodiments of the present disclosure, a respiratory protective device is provided. In some embodiments, the respiratory protective device comprises at least one fan component secured to the respiratory protective device; at least one sound sensor component positioned within the respiratory protective device and generating a detected sound signal; and a controller component electronically coupled to the at least one fan component.

In some embodiments, the controller component is configured to: receive a detected fan speed signal comprising a detected rotation speed indication associated with the at least one fan component; retrieve a corresponding noise profile data object from a plurality of noise profile data objects based at least in part on the detected rotation speed indication; generate a noise-reduced sound signal based at least in part on the corresponding noise profile data object and the detected sound signal; and transmit the noise-reduced sound signal to a data communication component.

In some embodiments, the respiratory protective device further comprises: an audio controller component in electronic communication with the at least one sound sensor component and the controller component.

In some embodiments, the audio controller component is configured to: receive the detected sound signal from the at least one sound sensor component; and transmit the detected sound signal to the controller component.

In some embodiments, the corresponding noise profile data object comprises a rotation speed indication, one or more threshold sensitivity indications, and one or more frequency band indications.

In some embodiments, when generating the noise-reduced sound signal, the controller component is configured to: determine one or more gain control parameters for each of the one or more frequency band indications; and apply at least one of a time-smoothing model or a frequency-smoothing model on the detected sound signal.

In some embodiments, each of the plurality of noise profile data objects is associated with one of a plurality of rotation speed indications.

In some embodiments, prior to receiving the detected fan speed signal, the controller component is configured to: generate the plurality of noise profile data objects; and store the plurality of noise profile data objects in a data storage component.

In some embodiments, when generating the plurality of noise profile data objects, the controller component is configured to: determine a rotation speed indication from the plurality of rotation speed indications; transmit a fan component activation signal to the at least one fan component, wherein the fan component activation signal comprises the rotation speed indication; receive a sound signal generated by the at least one sound sensor component; and generate a noise profile data object based at least in part on the sound signal.

In some embodiments, the noise profile data object comprises the rotation speed indication, one or more threshold sensitivity indications, and one or more frequency band indications. In some embodiments, when generating the noise profile data object, the controller component is configured to: determine the one or more frequency band indications associated with the sound signal; calculate one or more statistical metric parameters associated with each of the one or more frequency band indications; and determine the one or more threshold sensitivity indications associated with each of the one or more frequency band indications based at least in part on the one or more statistical metric parameters.

In some embodiments, the controller component is configured to: receive a noise reduction calibration indication; generate a plurality of calibrated noise profile data objects; and update the plurality of noise profile data objects based at least in part on the plurality of calibrated noise profile data objects.

In some embodiments, the controller component is configured to: determine a calibrated rotation speed indication from the plurality of rotation speed indications; transmit a fan component activation signal to the at least one fan component, wherein the fan component activation signal comprises the calibrated rotation speed indication; receive a calibrated sound signal generated by the at least one sound sensor component; and generate a calibrated noise profile data object based at least in part on the calibrated sound signal.

In some embodiments, the calibrated noise profile data object comprises the calibrated rotation speed indication, one or more calibrated threshold sensitivity indications, and one or more calibrated frequency band indications. In some embodiments, when generating the calibrated noise profile data object, the controller component is configured to: determine the one or more calibrated frequency band indications associated with the calibrated sound signal; calculate one or more calibrated statistical metric parameters associated with each of the one or more calibrated frequency band indications; and determine the one or more calibrated threshold sensitivity indications associated with each of the one or more calibrated frequency band indications based at least in part on the one or more calibrated statistical metric parameters.

In accordance with various embodiments of the present disclosure, a computer-implemented method is provided. In some embodiments, the computer implemented method comprises receiving a detected fan speed signal comprising a detected rotation speed indication associated with the at least one fan component; retrieving a corresponding noise profile data object from a plurality of noise profile data objects based at least in part on the detected rotation speed indication; generating a noise-reduced sound signal based at least in part on the corresponding noise profile data object and the detected sound signal; and transmitting the noise-reduced sound signal to a data communication component.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to receive a detected fan speed signal comprising a detected rotation speed indication associated with the at least one fan component; retrieve a corresponding noise profile data object from a plurality of noise profile data objects based at least in part on the detected rotation speed indication; generate a noise-reduced sound signal based at least in part on the corresponding noise profile data object and the detected sound signal; and transmit the noise-reduced sound signal to a data communication component.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
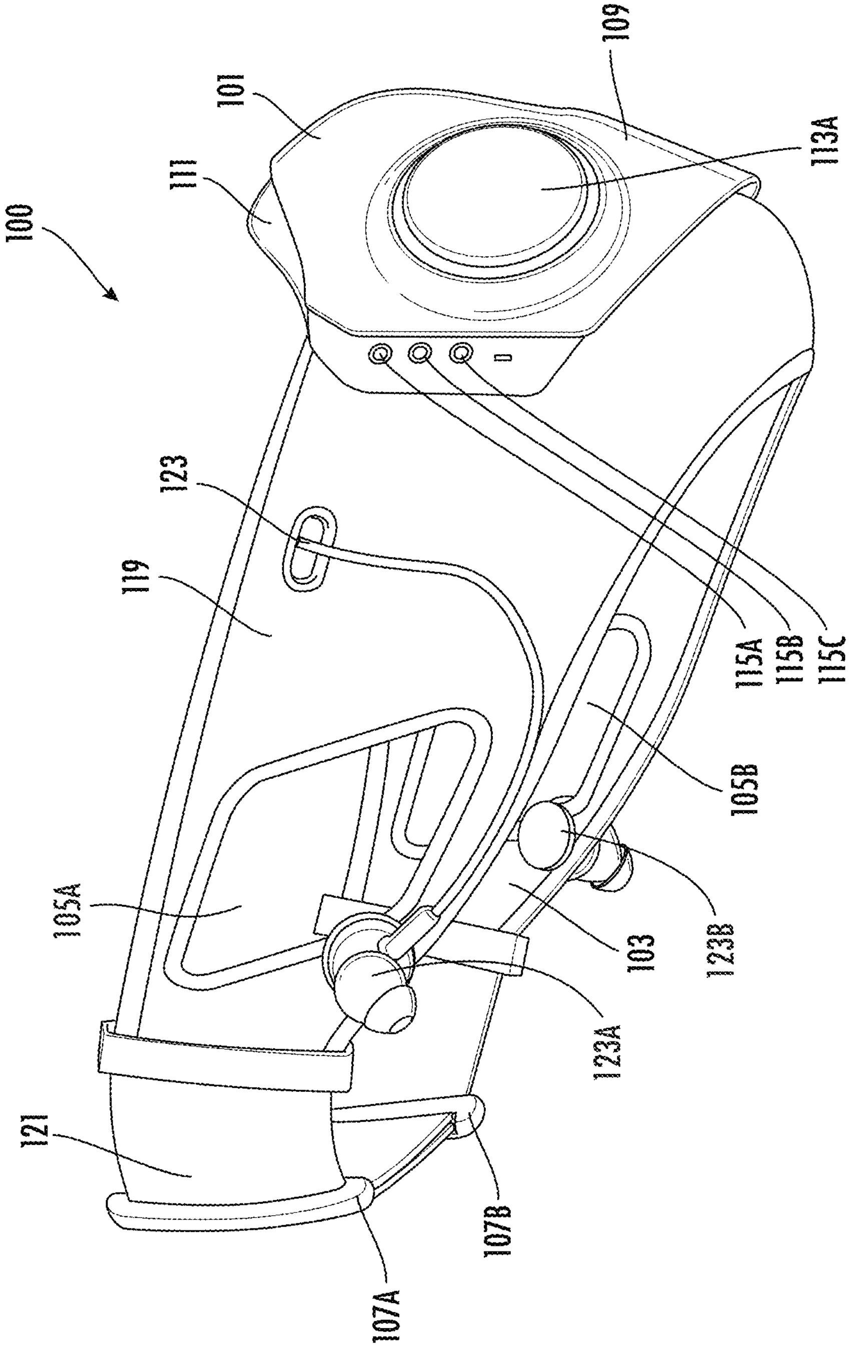
FIG. 1 illustrates an example side view of an example respiratory protective device in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Respiratory protective devices (such as, but not limited to, masks, respirators, and/or the like) can protect the health of not only those who wear them, but also those around people who wear them. For example, when a user wears a respiratory protective device, the respiratory protective device can prevent inhalation of hazardous substances (such as, but not limited to, harmful dusts, smokes, mists, gasses, vapors, and/or the like) from the environment. As another example, respiratory protective devices can reduce the likelihood and the amount of droplets and aerosols that are released by users into the environment through exhalation, therefore can reduce and/or prevent spreading of respiratory viruses.

However, there are many technical challenges and difficulties associated with respiratory protective devices.

For example, many users need to conduct a telephone call while wearing respiratory protective devices. As an example, a worker at a work site may be required to wear respiratory protective devices such as, but not limited to, masks, respirators, and/or the like to prevent inhalation of hazardous substances from the environment and, at the same time, may be required to conduct telephone calls in order to communicate with fellow workers. As such, some masks may provide a microphone inside the mask to capture the user's voice.

Some masks may provide active ventilation through implementing one or more fans in the masks. Such masks are also referred to as "breathing responsive masks." In breathing responsive masks, operations of the one or more fans are triggered automatically based on the user's breathing pattern. For example, when a user wearing the mask inhales, the fan runs with a fast speed to provide as much air as possible such that the user can inhale easier. When the user wearing the mask exhales, the fan stops running (or runs at a decreased fan speed) such that air pressure inside the mask is decreased, allowing the user to exhale easier. As such, breathing responsive masks can facilitate the user's breathing and improve the user's experience in wearing masks.

However, when the fan is operating (for example, when the user inhales and/or needs more air) and/or when the fan is increasing speed, the fan can produce a significant amount of noise that negatively impacts the quality of voice captured from the user (even when the microphone provides environmental noise cancellation (ENC)).

Various embodiments of the present disclosure overcome these technical challenges and difficulties, and provide various technical improvements and benefits.

For example, various embodiments of the present disclosure generate and store noise profile data objects associated with different breathing phases (especially during exhalation). In some embodiments, when the user's voice is detected (for example, when a detected sound signal is generated), various embodiments of the present disclosure determine the current breathing phase of the user (for example, based on the current fan speed signal), and then determine the corresponding noise profile data object associated with the current breathing phase. With reliable breath tracking, various embodiments of the present disclosure can determine the noise profile data object that reflects the current noise level within the respiratory protective device as closely as possible. In some embodiments, the respiratory protective device applies noise suppression algorithms based on the noise profile data object to reduce or remove noise from the detected sound signal.

In accordance with some embodiments of the present disclosure, an example respiratory protective device can not only control operations of the fan component and receive fan speed signals associated with the fan component, but also reduce or remove the noise from voice captured by the respiratory protective device based at least in part on the breathing pattern to improve the quality of voice. As such, various embodiments of the present disclosure increase the amount of noise reduction and improve the quality of voice captured from a user (for example, but not limited to, for a telephone call) wearing the example respiratory protective device.

In some embodiments, by generating the noise profile data objects prior to receiving the detected fan speed signals (for example, as a last step of manufacturing the example respiratory protective device), various embodiments of the present disclosure provide reliable and efficient solutions that provide verifiable improvement in noise reduction and voice capture in respiratory protective devices.

As such, an example respiratory protective device in accordance with some embodiments of the present disclosure implements wearable technology with ergonomically fit designs that enhance multiple functions to suit the modern lifestyle. For example, an example respiratory protective device in accordance with some embodiments of the present disclosure not only provides High Efficiency Particulate Air (HEPA) filters and Near-Field Communication (NFC) chips, but also provides features such as detections of breath pattern and air quality monitoring for optimal breathability. Additionally, or alternatively, an example respiratory protective device in accordance with some embodiments of the present disclosure can boast active noise canceling (ANC) audio and environmental noise cancellation (ENC) microphone capabilities, with Bluetooth® 5.2 connectivity and a magnetic earbud docking system and more, therefore satisfying the need from users for a respiratory protective device that provides capabilities such as improved noise reduction and improved voice capture.

Referring now to FIG. 1, an example perspective view of an example respiratory protective device 100 (also referred to as a respiratory protective equipment) in accordance with some example embodiments described herein is illustrated.

In some embodiments, the example respiratory protective device 100 is in the form of a respirator or a mask. For example, as shown in FIG. 1, the example respiratory protective device 100 comprises a mask component 101 and a strap component 103.

While the description above provides an example of a respiratory protective device in the form of a respirator/mask, it is noted that the scope of the present disclosure is not limited to the description above. In some examples, an example respiratory protective device may be in one or more additional and/or alternative forms.

Referring back to FIG. 1, in some embodiments, the strap component 103 may be in the form of a strap that connects or fastens one end of the mask component 101 to another end of the mask component 101.

In some embodiments, the strap component 103 comprises at least one non-elastic portion 119 and at least one elastic portion 121. In some embodiments, the at least one elastic portion 121 is connected to the at least one non-elastic portion 119.

In some embodiments, the at least one non-elastic portion 119 may comprise nonelastic materials (or materials with low elasticity) such as, but not limited to, cotton, yarns, fabric (including, but not limited to, woven fabric, non-woven fabric), and/or the like. In some embodiments, the mask component 101 is secured on the at least one non-elastic portion 119.

In some embodiments, at least one elastic portion 121 may comprise elastic material(s) such as, but not limited to, polymers, thermoplastic elastomers (TPE), and/or the like. In some embodiments, the at least one elastic portion 121 allows the strap component 103 to adapt to different head sizes of users.

For example, in the example shown in FIG. 1, the at least one elastic portion 121 of the strap component 103 may be inserted through one or more strap bucket components (such as the strap bucket component 107A and the strap bucket component 107B as shown in FIG. 1). In some embodiments, the one or more strap bucket components (such as the strap bucket component 107A and the strap bucket component 107B as shown in FIG. 1) may be in the form of one or more buckles that include, but not limited to, a tri-glide buckle). In some embodiments, when the one or more strap bucket components (such as the strap bucket component 107A and the strap bucket component 107B as shown in FIG. 1) move along the at least one elastic portion 121 of the strap component 103, the length of the strap component 103 is adjusted. As such, a user can adjust the length of the strap component 103 so that the example respiratory protective device 100 can be secured to a user's face.

In some embodiments, the strap component 103 may comprise an ear opening 105A and an ear opening 105B. When the example respiratory protective device 100 is worn by a user, the ear opening 105A and the ear opening 105B may allow the user's left ear and right ear to pass through.

In some embodiments, the mask component 101 is connected or fastened to the strap component 103. In the example shown in FIG. 1, the mask component 101 is secured to the at least one non-elastic portion 119 of the strap component 103. For example, the mask component 101 may be fastened to the at least one non-elastic portion 119 of the strap component 103 through one or more chemical glues. Additionally, or alternatively, the mask component 101 may be fastened to the at least one non-elastic portion 119 of the strap component 103 through one or more fastener components (such as, but not limited to, one or more snap buttons).

While the description above provides an example fastening mechanism to secure the mask component to the strap component, it is noted that the scope of the present disclosure is not limited to the description above. In some examples, an example mask component may be secured to an example strap component through one or more additional and/or alternative mechanisms. For example, a first end of the strap component can be connected to a first end of the mask component, and a second end of the strap component can be connected to a second of the mask component. In this example, the first end of the mask component is opposite to the second end of the mask component.

As described above, the mask component 101 may be in the form of a mask or a respirator. In the example shown in FIG. 1, the mask component 101 may comprise an outer shell component 109 and a face seal component 111.

In some embodiments, when the example respiratory protective device 100 is worn by a user, an outer surface of the outer shell component 109 is exposed to the outside environment. In some embodiments, the face seal component 111 is attached to and extends from a periphery and/or edge of the outer shell component 109 (or is attached to and extends from a periphery and/or edge of or an inner shell component of the mask component as described herein).

In some embodiments, the face seal component 111 may comprise soft material such as, but not limited to, silica gel. In some embodiments, when the example respiratory protective device 100 is worn by a user, the face seal component 111 is in contact with the user's face, and may seal the example respiratory protective device 100 to at least a portion of a user's face. As described above, the example respiratory protective device 100 includes a strap component 103 that allows the example respiratory protective device 100 to be secured to the user's head. As such, the face seal component 111 can create at least partially enclosed (or entirely enclosed) space between at least a portion of the user's face (e.g., mouth, nostrils, etc.) and the example respiratory protective device 100, details of which are described herein.

In some embodiments, the mask component 101 comprises one or more puck components that cover one or more inhalation filtration components of the example respiratory protective device 100. In some embodiments, each of the puck components is in the form of a circular cover structure. Additionally, or alternatively, each of the puck components can be in other shapes and/or forms.

In the example shown in FIG. 1, the example respiratory protective device 100 comprises a first puck component 113A that is disposed on a left side of the outer shell component 109 and a second puck component that is disposed on a right side of the outer shell component 109. In such an example, the first puck component 113A covers a first inhalation filtration component that is disposed on the left side of the mask component 101, and the second puck component covers a second inhalation filtration component that is disposed on the right side of the mask component 101, details of which are described herein.

In some embodiments, the mask component 101 comprises one or more key components (such as, but not limited to, the key component 115A, the key component 115B, and the key component 115C as shown in FIG. 1). In some embodiments, each of the one or more key components is a physical button that may allow a user to manually control operations of various components of the mask component 101 (such as, but not limited to, the fan components as described herein) and/or other devices that are in electronic communication with the example respiratory protective device 100 (such as, but not limited to, earpiece devices).

In some embodiments, the example respiratory protective device 100 comprises one or more earpiece devices. In the example shown in FIG. 1, the example respiratory protective device 100 comprises an earpiece device 123A and an earpiece device 123B. In some embodiments, each of the earpiece device 123A and the earpiece device 123B are active noise canceling (ANC) earbuds. In some embodiments, a user may utilize at least the earpiece device 123A and the earpiece device 123B to conduct one or more telephone calls.

Figure 2A:
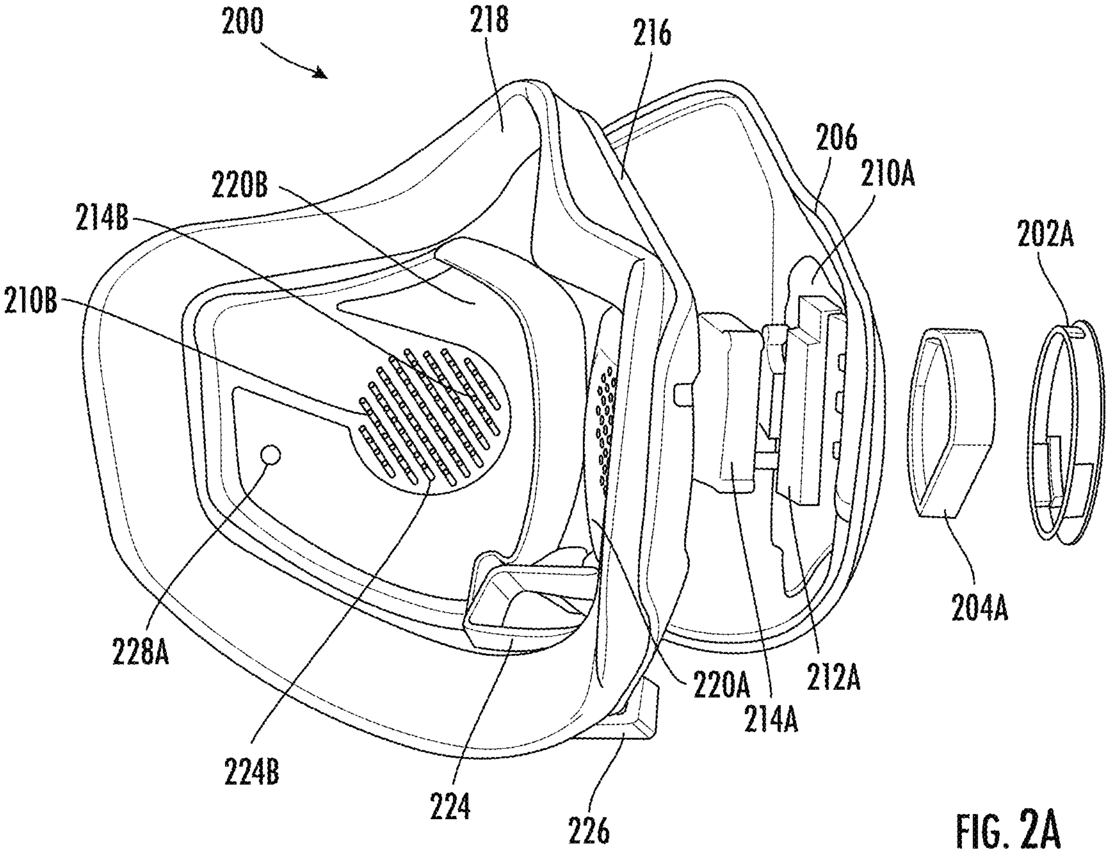
FIG. 2A illustrates an example exploded view of an example mask component in accordance with some example embodiments described herein.
Figure 2B:
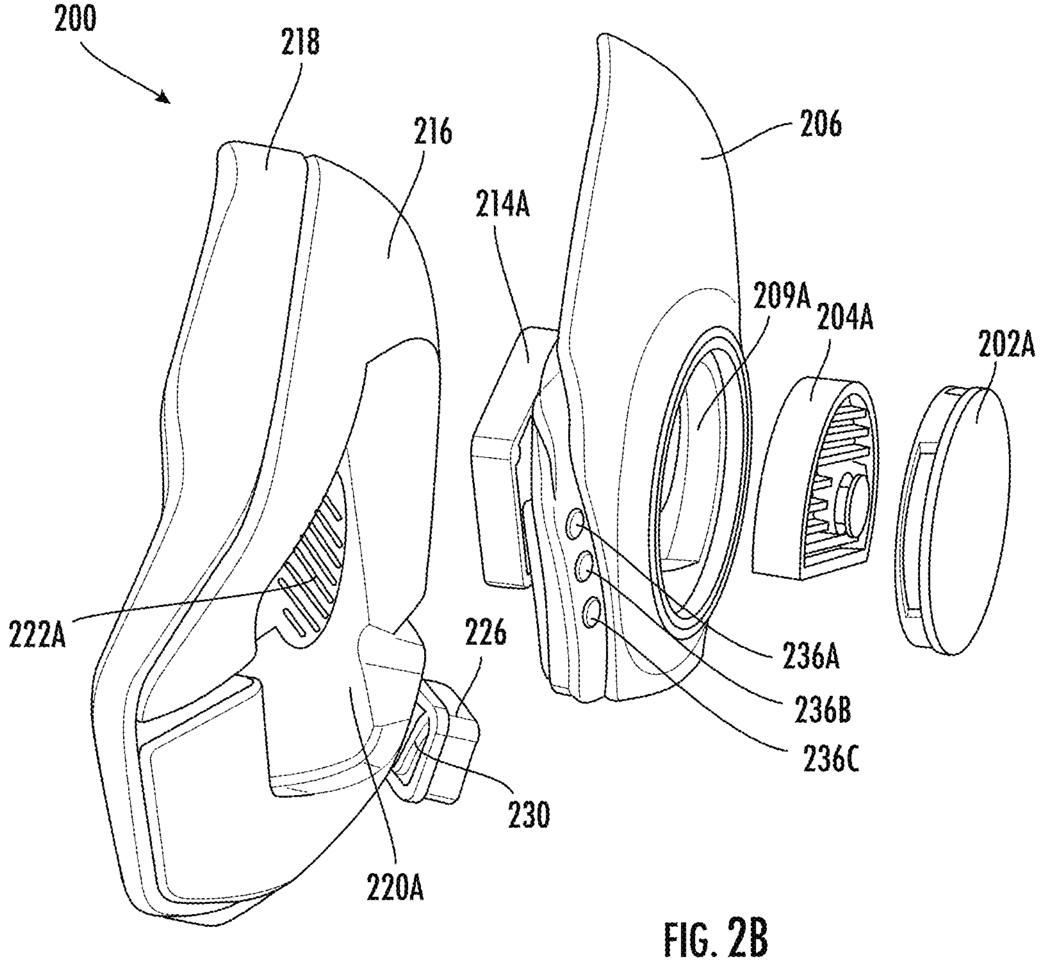
FIG. 2B illustrates another example exploded view of an example mask component in accordance with some example embodiments described herein.
Figure 2C:
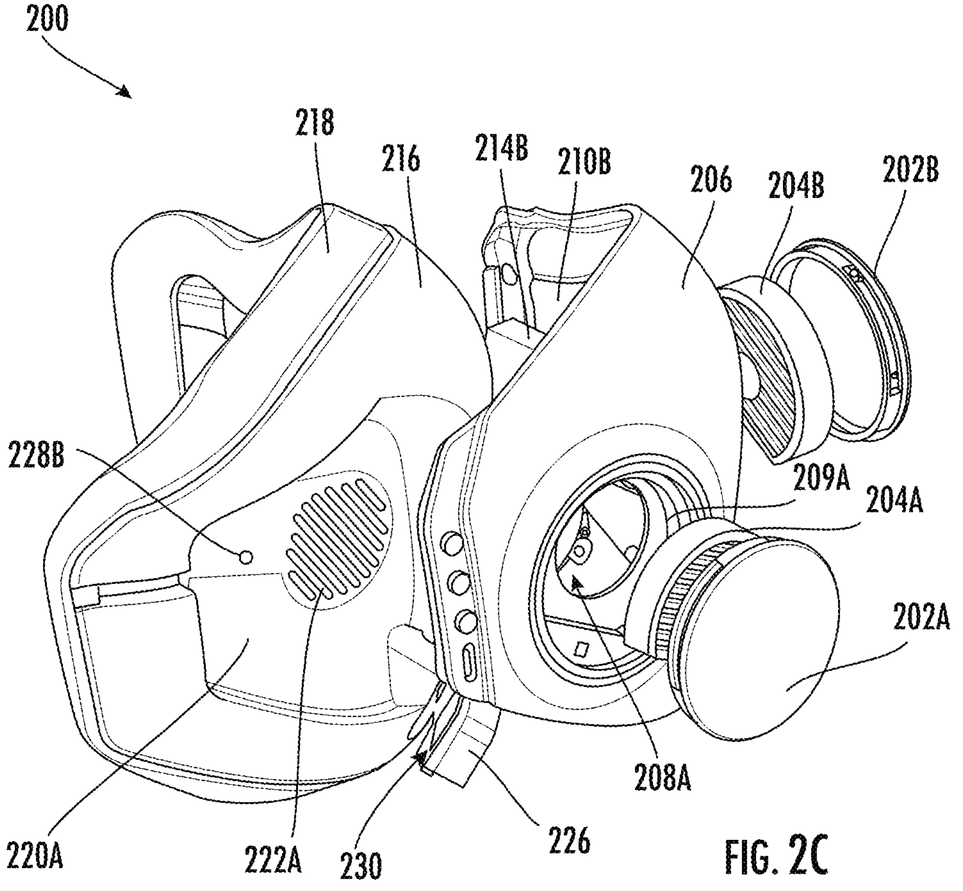
FIG. 2C illustrates another example exploded view of an example mask component in accordance with some example embodiments described herein.
Figure 2D:
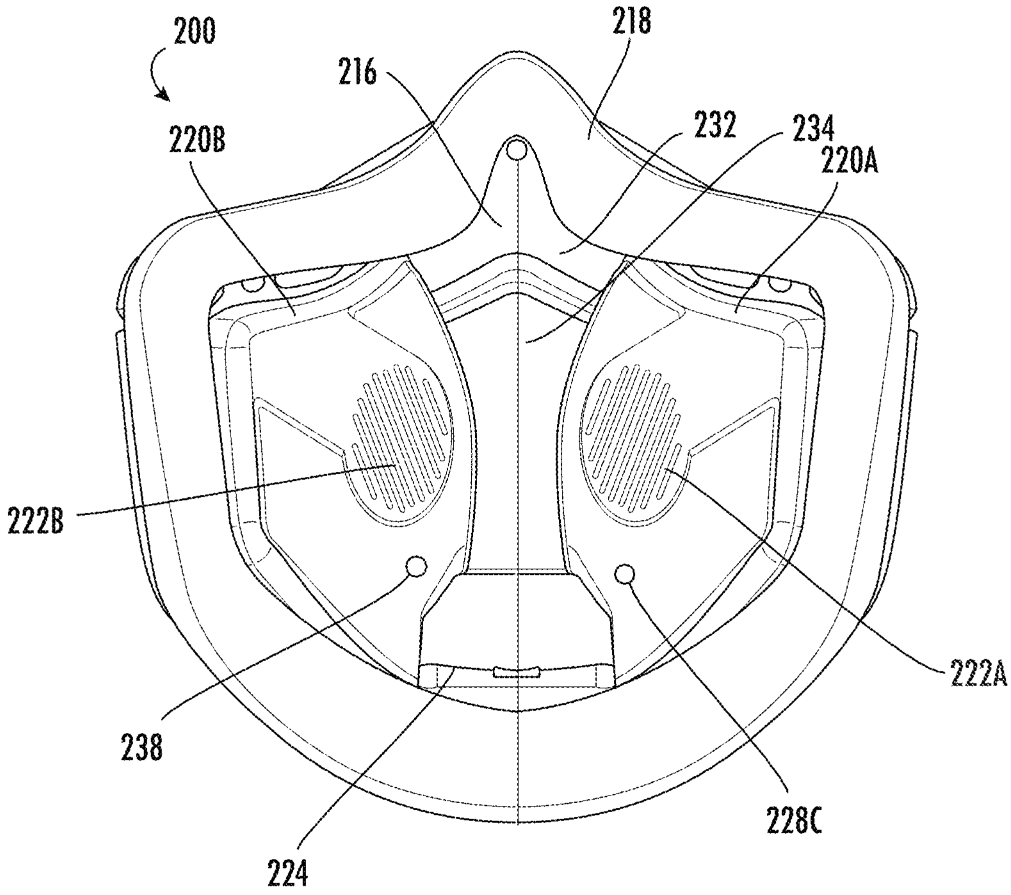
FIG. 2D illustrates an example back view of an example mask component in accordance with some example embodiments described herein.

Referring now to FIG. 2A, FIG. 2B, FIG. 2C, and FIG. 2D, example views of an example mask component 200 in accordance with some example embodiments of the present disclosure are illustrated. In particular, FIG. 2A to FIG. 2C illustrate example exploded views of the example mask component 200, and FIG. 2D illustrates an example back view of the example mask component 200.

As shown in FIG. 2A, the mask component 200 comprises an outer shell component 206 and an inner shell component 216.

In some embodiments, the inner shell component 216 may be in a shape that is based on the contour of the user's face. In particular, when the mask component 200 is worn by a user, at least a portion of the user's face (such as, but not limited to, mouth, nostrils) are housed within the inner shell component 216.

In some embodiments, the mask component 200 may comprise a face seal component 218. In some embodiments, the face seal component 218 is attached to and extends from a periphery and/or edge of the inner shell component 216. Similar to the face seal component 111 described above in connection with FIG. 1, the face seal component 218 may comprise soft material such as, but not limited to, silica gel. In some embodiments, when the mask component 200 is worn by a user, the face seal component 218 and an inner surface of the inner shell component 216 create an enclosed space between at least a portion of the user's face (e.g., on the mouth, nostrils, etc.) and the mask component 200.

Similar to the shape of the inner shell component 216 described above, the shape of the outer shell component 206 may be based on a contour of the user's face. In some embodiments, when the mask component 200 is assembled, the inner surface of the outer shell component 206 is secured to an outer surface of the inner shell component 216.

In some embodiments, the inner shell component 216 may comprise one or more indentation portions on the outer surface of the inner shell component 216. In particular, each of the one or more indentation portions may be sunken or depressed from the outer surface of the inner shell component 216. In the example shown in FIG. 2A, FIG. 2B, and FIG. 2C, the inner shell component 216 may comprise inner shell indentation portions such as, but not limited to, an inner shell indentation portion 220A that is on a left side of the inner shell component 216 and an inner shell indentation portion 220B that is on a right side of the inner shell component 216.

In some embodiments, when the inner surface of the outer shell component 206 is secured to outer surface of the inner shell component 216, the indentation portions of the inner shell component 216 (e.g., the inner shell indentation portion 220A and inner shell indentation portion 220B) may create space between the inner shell component 216 and the outer shell component 206.

In some embodiments, one or more components of the mask component 200 are housed, disposed, or positioned within the space formed by the indentation portions of the inner shell component 216 (e.g., the inner shell indentation portion 220A and inner shell indentation portion 220B) and the outer shell component 206. For example, one or more circuit board components, one or more power charging components, and one or more fan components may be disposed in the space that is defined by the inner shell indentation portions of the inner shell component 216 and the outer shell component 206.

In the examples shown in FIG. 2A, FIG. 2B, and FIG. 2C, a circuit board component 210A, a power charging component 212A, and a fan component 214A are disposed in the space that is defined by the inner shell indentation portion 220A of the inner shell component 216 and the outer shell component 206. Additionally, or alternatively, a circuit board component 210B, a power charging component, and a fan component 214B are disposed in the space that is defined by the inner shell indentation portion 220B and the outer shell component 206.

In some embodiments, an example circuit board component comprises a medium or a substrate where one or more electronic components can be secured to and in electronic communications with one another. In some embodiments, an example circuit board component may be in the form of one or more printed circuit boards (PCBs). For example, the example circuit board component may comprise one or more layers such as, but not limited to, a conductive layer and an insulating layer. In such an example, the conductive layer defines conductive pads and patterns of traces and wires that connect the conductive pads.

In some embodiments, one or more electronic components may be soldered, fixed, or otherwise electronically coupled to one or more conductive pads, such that the one or more electronic components can be in electronic communications with one another. Examples of the electronic components include, but are not limited to, a main controller component, an analog-to-digital converter component, a data communication component, and/or the like.

In some embodiments, a main controller component is electronically coupled to the circuit board component. For example, an example main controller component in accordance with some embodiments of the present disclosure may be in the form of a microcontroller or a microcontroller unit. In such an example, the pins of the microcontroller or the microcontroller unit can be securely connected and electronically coupled to the conductive pads of the circuit board component. Additional details associated with the main controller component are described herein, including, but not limited to, those described in connection with at least FIG. 3 and FIG. 4.

Additionally, or alternatively, an analog-to-digital converter component is electronically coupled to the circuit board component. For example, an example analog-to-digital converter component in accordance with some embodiments of the present disclosure may be in the form of an analog-to-digital converter (ADC) that converts an analog signal into a digital signal. Additional details associated with the analog-to-digital converter component are described herein, including, but not limited to, those described in connection with at least FIG. 3.

Additionally, or alternatively, a data communication component is electronically coupled to the circuit board component. For example, an example data communication component in accordance with some embodiments of the present disclosure may be in the form of semiconductor integrated circuits (IC) that may comprise one or more transmitters and/or one or more receivers. In some embodiments, an example data communication component may support one or more data communication protocols, including, but not limited to, those described in connection with at least FIG. 3.

While the description above provides an example of a circuit board component and example components that are securely connected and/or electronically coupled to an example circuit board component, it is noted that the scope of the present disclosure is not limited to the description above. For example, an example mask component may comprise only one circuit board component. Additionally, or alternatively, an example circuit board component may comprise more than one PCB. Additionally, or alternatively, an example circuit board component may connect one or more other electronic components.

As described above, at least one fan component is secured to an example respiratory protective device in accordance with some embodiments of the present disclosure. In some embodiments, the example fan component may comprise an electric fan. In some embodiments, each of one or more fan components of the mask component is disposed in the space that is defined by an inner shell indentation portion of the inner shell component and the outer shell component.

For example, the mask component 200 comprises a fan component 214A and a fan component 214B. In some embodiments, the fan component 214A may be disposed on the right side of the mask component 200 and in the space that is defined by the inner shell indentation portion 220A of the inner shell component 216 and the outer shell component 206. In some embodiments, the fan component 214B may be disposed on the left side of the mask component 200 and in the space that is defined by the inner shell indentation portion 220B of the inner shell component 216 and the outer shell component 206.

While the description above provides an example mask component comprising two fan components, it is noted that the scope of the present disclosure is not limited to the description above. In some examples, an example mask component may comprise less than two or more than two fan components.

In some embodiments, an example fan component may operate at different rotation speeds. For example, the example fan component may be in the form of a stepped fan that provides different, predetermined settings for rotation speeds. Additionally, or alternatively, the example fan component may be in the form of a stepless fan that enables continuous adjustment of the rotation speed.

In some embodiments, an example fan component may operate at different rotational directions. For example, the example fan component may operate in a forward direction or a reverse direction. As an example, when the example fan component operates in the forward rotational direction, the electric fan of the example fan component may rotate counter-clockwise (when viewing from a user wearing the mask component 200) and/or may operate as a blower that draws air from outside the mask component 200 to inside the mask component 200. As another example, when the example fan component operates in the reverse rotational direction, the example fan component may rotate clockwise (when viewing from a user wearing the mask component 200) and/or may operate as an exhaust/ventilation fan that draws air from inside the mask component 200 to outside the mask component 200.

In some embodiments, the one or more fan components are electronically coupled to the main controller component on the example circuit board component, such that the one or more fan components and the main controller component are in data communications with one another.

In some embodiments, various operation parameters of the fan components (such as, but not limited to, the start time, the stop time, the rotational directions (e.g., forward direction or reverse direction) and/or the rotation speed) may be controlled and/or adjusted by the main controller component.

For example, the main controller component may transmit a fan component activation signal to the fan component that causes the fan component to start operating (e.g., causes the electric fan to start rotating). In some embodiments, the fan component activation signal comprises a rotation speed value that indicates the speed for the fan component.

Additionally, or alternatively, the main controller component may transmit a fan component deactivation signal to the fan component that causes the fan component to stop operating (e.g., causes the electric fan to stop rotating).

Additionally, or alternatively, the main controller component may transmit a forward rotation start signal to a fan component that causes the fan component to start forward rotation (e.g., start operating as a blower that draws air from outside the mask component 200 towards inside the mask component 200). In some embodiments, the forward rotation start signal may include a forward rotation speed value that indicates the speed for the fan component. Additionally, or alternatively, the main controller component may transmit a forward rotation stop signal to the fan component that causes the fan component to stop forward rotation.

Additionally, or alternatively, the main controller component may transmit a reverse rotation start signal to a fan component that causes the fan component to start reverse rotation (e.g., start operating as an exhaust fan that draws air from inside the mask component 200 towards outside the mask component 200). In some embodiments, the reverse rotation start signal may include a reverse rotation speed value that indicates the speed for the fan component. Additionally, or alternatively, the main controller component may transmit a reverse rotation stop signal to the fan component that causes the fan component to stop reverse rotation.

In some embodiments, various operation parameters of the fan components (such as, but not limited to, the start time, the stop time, the rotational directions (e.g., forward direction or reverse direction) and/or the rotation speed) may be read or determined by the main controller component.

For example, the main controller component may receive one or more fan speed signals from the one or more fan components. In such an example, each of the one or more fan speed signals comprises a rotation speed indication associated with the corresponding fan component, and the rotation speed indication indicates a current rotation speed of the electric fan of the fan component.

In some embodiments, the power charging component 212A is electronically coupled to one or more electronic components on the circuit board component 210A (such as, but not limited to, the main controller component) and to one or more fan components (such as, but not limited to, the fan component 214A and the fan component 214B). In some embodiments, the power charging component 212A may provide power to the one or more electronic components on the circuit board component 210A (such as, but not limited to, the main controller component) and to one or more fan components (such as, but not limited to, the fan component 214A and the fan component 214B).

For example, the power charging component 212A may comprise a device power source component.

In some embodiments, the device power source component refers to an electronic component that provides a source of electrical energy. In some embodiments, an example device power source component in accordance with some embodiments of the present disclosure may be in the form of, such as but not limited to, one or more batteries, one or more supercapacitors, one or more ultracapacitors, and/or the like.

In some embodiments, the device power source component is electronically coupled to one or more electronic components associated with the respiratory protective device (such as, but not limited to, the main controller component). In such examples, the device power source component provides electrical energy to these electronic components.

In some embodiments, the example device power source component is rechargeable. For example, an example device power source component in accordance with some embodiments of the present disclosure can be recharged through, for example, a wireless charger circuit, a Universal Serial Bus (USB) charger circuit, an integrated circuit (IC) battery charger circuit, and/or the like.

Additionally, in some embodiments, the power charging component 212A may comprise the device power source component and a power charging circuit component.

In some embodiments, the device power source component can charge other electronic components through the charging circuit component. For example, the power charging circuit component may be electronically coupled to the device power source component and one or more other electronic components that are associated with the respiratory protective device (such as, but not limited to, the main controller component). In such an example, the power charging circuit component transfers electrical energy from the device power source component to the one or more other electronic components. In some embodiments, the power charging circuit component optimizes the electrical energy from the device power source component for consumption by other electronic components. For example, the power charging circuit component may comprise one or more voltage regulators so that a constant voltage can be provided to other electronic components. Additionally, or alternatively, the power charging circuit component may comprise one or more voltage divider circuits so that a suitable voltage can be provided to other electronic components.

While the description above provides example components (such as, but not limited to, circuit board components, fan components, and power charging components) that are housed, disposed, or positioned within the space formed by the indentation portions of the inner shell component 216 and the outer shell component 206, it is noted that the scope of the present disclosure is not limited to the examples above. In some embodiments, circuit board components, fan components, and/or power charging components may be disposed or positioned outside the space formed by the indentation portions of the inner shell component 216 and the outer shell component 206. In some embodiments, one or more other components may additionally or alternatively be housed, disposed, or positioned within the space formed by the indentation portions of the inner shell component 216 and the outer shell component 206.

Referring back to FIG. 2B, the mask component 200 may comprise one or more key components such as, but not limited to, a key component 236A, a key component 236B, and a key component 236C. In some embodiments, the one or more key components may be disposed on an outer surface of the outer shell component 206. In some embodiments, each of the one or more key components may provide a button that allows a user to control and/or adjust the operations of various electronic components described herein (such as, but not limited to, fan components, earpieces, and/or the like).

In some embodiments, when the mask component 200 is worn by a user, the user can inhale through the mask component 200. In some embodiments, the air inhaled by the user is filtered by one or more inhalation filtration components.

For example, the mask component 200 may comprise one or more inhalation filtration components (such as, but not limited to, inhalation filtration component 204A and inhalation filtration component 204B). In some embodiments, each of the one or more inhalation filtration components may comprise a filter media element that comprise filter material for filtering air. Examples of filter material include, but are not limited to, high efficiency particulate air (HEPA) filters.

While the description above provides an example mask component comprising two inhalation filtration components, it is noted that the scope of the present disclosure is not limited to the description above. In some examples, an example mask component may comprise less than two or more than two inhalation filtration components.

In some embodiments, the mask component 200 comprises one or more puck components (such as, but not limited to puck component 202A and puck component 202B). In some embodiments, each of the one or more puck components may be positioned to cover one of the inhalation filtration components so as to prolong the lifespan of the mask component 200. For example, the puck component 202A may cover the inhalation filtration component 204A, and the puck component 202B may cover the inhalation filtration component 204B.

In some embodiments, the one or more inhalation filtration components (such as, but not limited to, inhalation filtration component 204A and inhalation filtration component 204B) are disposed in outer shell indentation portion(s) of the outer shell component 206.

For example, as shown in FIG. 2C, the outer shell component 206 of the example mask component 200 may comprise one or more outer shell indentation portions (such as, but not limited to, the outer shell indentation portion 209A). In some embodiments, each of the outer shell indentation portions (such as the outer shell indentation portion 209A) may be sunken or depressed from the outer surface of the outer shell component 206. In the example shown in FIG. 2C, an inhalation filtration component 204A is disposed in the outer shell indentation portion 209A of the outer shell component 206.

In some embodiments, each of the one or more outer shell indentation portions may comprise an air inlet opening. In the example shown in FIG. 2C, the outer shell indentation portion 209A of the outer shell component 206 comprises the air inlet opening 208A.

In some embodiments, each of the one or more inhalation filtration components (that are disposed in an outer shell indentation portion of an outer shell component) is positioned to at least partially or fully cover an air inlet opening of the outer shell indentation portion. In the example shown in FIG. 2C, the inhalation filtration component 204A is positioned on the outer shell indentation portion 209A of the outer shell component 206 and at least partially covers the air inlet opening 208A of the outer shell indentation portion 209A. As such, air may flow through the inhalation filtration component 204A and be released through the air inlet opening 208A of the outer shell indentation portion 209A.

As described above, an example mask component may comprise one or more fan components that are each disposed on an inner shell indentation portion of the inner shell component 216. In some embodiments, when the mask component 200 is assembled, the outer shell component 206 is secured to the inner shell component 216. In the example shown in FIG. 2B and FIG. 2C, a fan inlet of the fan component 214A (disposed on the inner shell indentation portion of the inner shell component 216) is aligned within the air inlet opening 208A (on the outer shell indentation portion 209A of the outer shell component 206). As such, air may flow from the air inlet opening 208A of the outer shell indentation portion 209A to the input opening of the fan component 214A.

In the present disclosure, a fan component may comprise a fan inlet and a fan outlet. In some embodiments, when the fan component operates, the fan component draws air in from the fan inlet and pushes air out through the fan outlet.

For example, an example fan component in accordance with some embodiments of the present disclosure may be in the form of a centrifugal fan. In such an example, the example fan component comprises impellers in the form of a rotating wheel of blades. When the impellers rotate, the impellers drag air in through the fan inlet and cause the air to enter into circular motions. The circular motions in turn create centrifugal forces, which pushes air out from the fan component through the fan outlet.

While the description above provides an example centrifugal fan as an example fan component, it is noted that the scope of the present disclosure is not limited to the description above. In some examples, an example fan component may be in one or more additional and/or alternative forms.

As described above, an example mask component may comprise one or more fan components that are each disposed on an inner shell indentation portion of the inner shell component 216. In some embodiments, each of the one or more inner shell indentation portions of the inner shell component 216 may comprise one or more air inlet slots. In some embodiments, the one or more fan outlet(s) of the one or more fan components are each aligned with one of the one or more air inlet slots on the inner shell component 216.

For example, in the example shown in FIG. 2C, the inner shell indentation portion 220A comprises air inlet slots 222A on the bottom surface of the inner shell indentation portion 220A. In some embodiments, the fan outlet of the fan component 214A is aligned with the air inlet slots 222A. As such, the fan component 214A pushes air out from the fan outlet and through the air inlet slots 222A of the inner shell indentation portion 220A.

While the description above describes example air inlet slots that are disposed on the bottom surface of the inner shell indentation portion of the inner shell component, it is noted that the scope of the present disclosure is not limited to the description above. In some examples, one or more air inlet slots may be additionally or alternatively disposed on the side surfaces of the inner shell indentation portion of the inner shell component.

In accordance with some embodiments of the present disclosure, example fan components in the mask component can facilitate the user's breathing.

For example, when the user inhales, the fan component 214A may operate in a forward direction that draws air from outside the mask component 200 towards inside the mask component 200. In this example, the fan component 214A drags air from the outside environment through the inhalation filtration component 204A, then through the air inlet opening 208A on the outer shell indentation portion 209A of the outer shell component 206, and then into the fan inlet of the fan component 214A. Continuing this example, the fan component 214A pushes air out from the fan outlet of the fan component 214A, then through the air inlet slots 222A of the inner shell indentation portion 220A, and then into the space between the user's face and the mask component 200. In some embodiments, the fan component 214A can increase the volume and/or the flow rate of air entering the space between the user's face and the mask component 200, thereby facilitating the inhalation of the user.

In some embodiments, when the mask component 200 is worn by a user, the user can exhale through the mask component 200. In some embodiments, the air exhaled by the user is filtered by one or more exhalation filtration components.

For example, referring now to FIG. 2D, an example back view of the example mask component 200 is illustrated. In particular, FIG. 2D illustrates the inner surface of the inner shell component 216 when the example mask component 200 is worn by a user.

In the example shown in FIG. 2D, the example mask component 200 may comprise air inlet slots that are located on the middle right side of the inner shell component 216 (for example, air inlet slots 222A) and/or air inlet slots that are located on the middle left side of the inner shell component 216 (for example, air inlet slots 222B).

In some embodiments, the inner surface 232 of the inner shell component 216 may comprise a nose portion 234, which is located close to a user's nose when the user wears the mask component 200. In this example, the air inlet slots 222A may be located to the right of the nose portion 234, and the air inlet slots 222B may be located to the left of the nose portion 234.

In some embodiments, the example mask component 200 may comprise an outlet opening 224 that is on a middle bottom portion of the inner shell component 216. In some embodiments, the outlet opening 224 may be located corresponding to the position of the user's mouth. For example, when a user exhales, the breath may be released through the outlet opening 224.

As shown in FIG. 2A to FIG. 2C, an exhalation filtration component 226 may be connected to the inner shell component 216 at the outlet opening 224. For example, the exhalation filtration component 226 may cover the outlet opening 224. In some embodiments, the exhalation filtration component 226 may comprise a filter media element that comprises filter material for filtering air. Examples of filter material include, but are not limited to, HEPA filters. As such, the breath that is exhaled by the user may be filtered before it is released from inside the mask component 200 to the outside environment.

In accordance with some embodiments of the present disclosure, various sensor components may be implemented in the example mask component 200 to detect, generate, and determine one or more operational signals associated with the example mask component 200.

For example, an example mask component in accordance with some embodiments of the present disclosure may comprise one or more pressure sensor components. For example, when the mask component 200 is worn by a user, the face seal component 218 and an inner surface 232 of the inner shell component 216 create an enclosed space on at least a portion of the user's face (e.g., on the mouth, nostrils, etc.). In some embodiments, a pressure sensor component may comprise a pressure sensor that detects the air pressure within this enclosed space. Examples of the pressure sensor components include, but are not limited to, resistive air pressure transducer or strain gauge, capacitive air pressure transducer, inductive air pressure transducer, and/or the like. In the example shown in FIG. 2A, a pressure sensor component 228A may be disposed on an inner surface of the inner shell component 216. Additionally, or alternatively, as shown in FIG. 2C, a pressure sensor component 228B may be disposed on the inner shell indentation portion 220A of the inner shell component 216. Additionally, or alternatively, as shown in FIG. 2D, a pressure sensor component 228C may be disposed on the inner surface of the inner shell component 216. In some embodiments, the pressure sensor component 228A, the pressure sensor component 228B, and/or the pressure sensor component 228C may detect the air pressure within the enclosed space defined by the face seal component 218 and the inner shell component 216 on at least a portion of the user's face.

Additionally, or alternatively, an example mask component in accordance with some embodiments of the present disclosure may comprise one or more humidity sensor components and/or one or more air quality sensor components.

In some embodiments, the mask component 200 comprises a humidity sensor component 230 that is disposed in the exhalation filtration component 226 and at least partially covers the outlet opening 224 of the inner shell component 216. In some embodiments, the humidity sensor component 230 may comprise a humidity sensor that may, for example but not limited to, detect humidity levels within the enclosed space and/or in the breath exhaled by the user. Examples of the humidity sensor component 230 include, but are not limited to, capacitive humidity sensors, resistive humidity sensors, thermal humidity sensors, and/or the like.

In some embodiments, the mask component 200 comprises an air quality sensor component in addition to or in alternative of the humidity sensor component 230. For example, the air quality sensor component may be disposed in the exhalation filtration component 226 and at least partially covers the outlet opening 224 of the inner shell component 216. In some embodiments, the air quality sensor component may comprise an air quality sensor that may, for example but not limited to, determine the air quality levels within the enclosed space and/or in the breath exhaled by the user. Examples of the air quality sensor component include, but are not limited to, volatile organic compounds (VOC) sensors, oxygen sensors, carbon dioxide sensors, and/or the like.

Additionally, or alternatively, an example mask component in accordance with some embodiments of the present disclosure may comprise one or more sound sensor components. In some embodiments, at least one sound sensor component is positioned within the respiratory protective device. For example, one or more sound sensor components are disposed on an inner surface of the inner shell component 216. For example, referring now to FIG. 2D, an example sound sensor component 238 is disposed on the inner surface 232 of the inner shell component 216. Additionally, or alternatively, one or more sound sensor components may be disposed at one or more locations in addition to or in alternative of the example shown in FIG. 2D.

In some embodiments, an example sound sensor component comprises a sound sensor that converts sound waves into electrical signals. For example, based on the detected sound waves, the example sound sensor component generates detected sound signals (for example, in the form of electrical current signals, electrical voltage signals, and/or the like). Examples of sound sensor components include, but are not limited to, microphones, acoustic sensors, noise sensors, and/or the like. As an example, an example sound sensor component may be in the form of an in-mask microphone that provides environmental noise cancellation (ENC) features for voice calls.

As described above, an example respiratory protective device 100 provides example earpiece devices. In some embodiments, a user may utilize the earpiece devices and the one or more sound sensor components to conduct telephone calls (for example, voice calls). For example, the earpiece devices may provide audio output for the telephone call and the one or more sound sensor components may provide audio input for the telephone call.

While the description above provides example sensor components in an example mask component, it is noted that the scope of the present disclosure is not limited to the description above. For example, an example mask component may comprise one or more additional and/or alternative sensor components.

Figure 3:
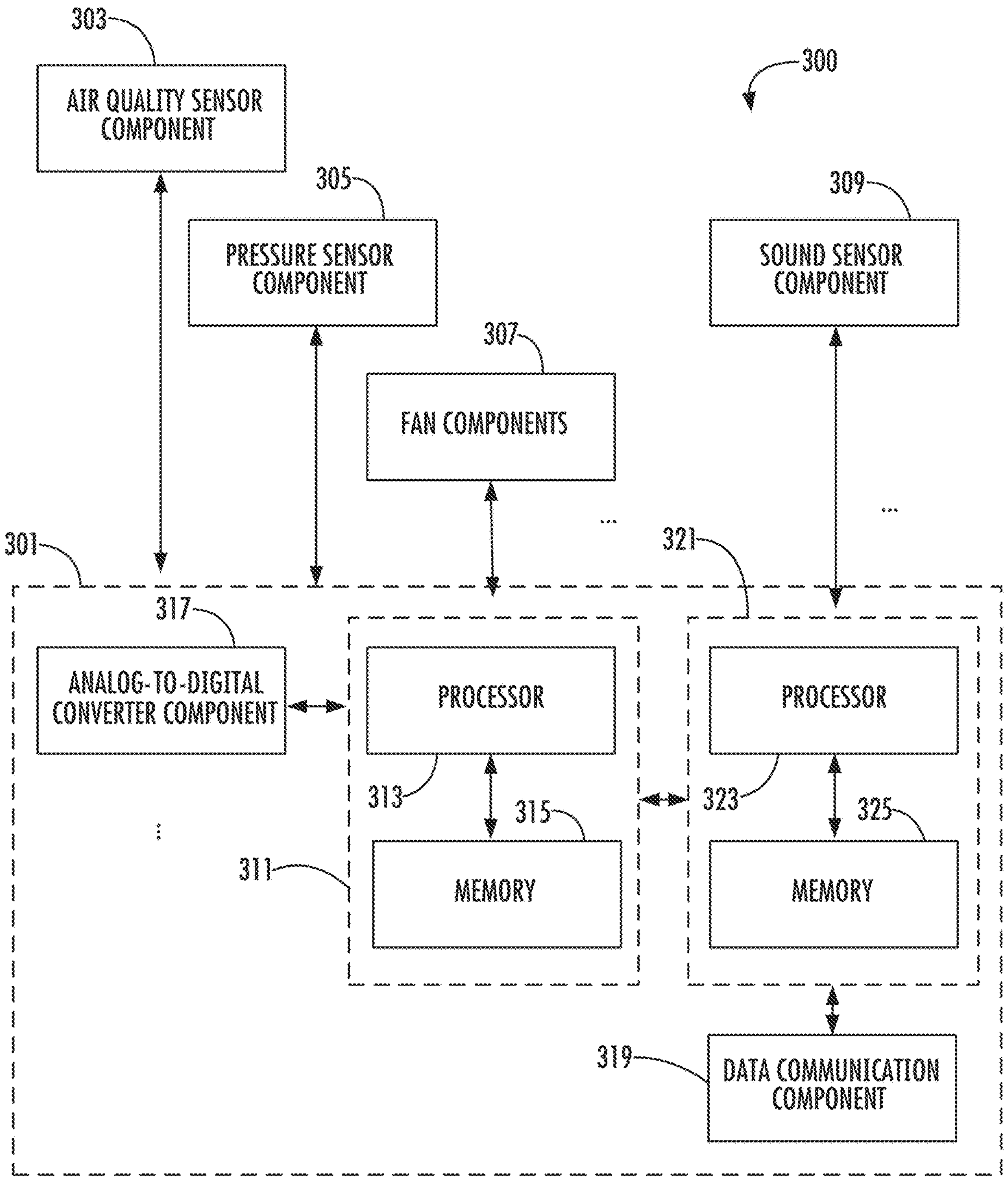
FIG. 3 provides an example block diagram illustrating example components associated with an example respiratory protective device in accordance with some embodiments of the present disclosure.

Referring now to FIG. 3, an example circuit diagram of an example respiratory protective device 300 in accordance with some example embodiments described herein is illustrated. In particular, FIG. 3 illustrates example electronic components of an example respiratory protective device 300 in accordance with various example embodiments of the present disclosure.

In the example shown in FIG. 3, the example respiratory protective device 300 may comprise a circuit board component 301 that is electronically coupled to one or more sensor components (such as, but not limited to, the air quality sensor component 303, the pressure sensor component 305), one or more fan components (such as the fan component 307), the sound sensor component 309, and/or the like.

As described above, the one or more electronic components are electronically coupled to the circuit board component 301. In the example shown in FIG. 3, the one or more electronic components comprise a main controller component 311, an analog-to-digital converter component 317, a data communication component 319, and/or the like.

In the example shown in FIG. 3, the main controller component 311 comprises a processor 313 and a memory 315.

In some embodiments, the processor 313 (and/or co-processor or any other processing circuitry assisting or otherwise associated with the processor) may be in communication with the memory 315 via a bus for passing information among components of the apparatus. The memory 315 may be non-transitory and may include, for example, one or more volatile and/or non-volatile memories. In other words, for example, the memory 315 may be an electronic storage device (e.g., a computer readable storage medium). The memory 315 may be configured to store information, data, content, applications, instructions, and/or the like, for enabling the main controller component 311 to carry out various functions in accordance with example embodiments of the present disclosure.

In some embodiments, the processor 313 may be embodied in a number of different ways and may, for example, include one or more processing devices configured to perform independently. Additionally, or alternatively, the processor 313 may include one or more processors configured in tandem via a bus to enable independent execution of instructions, pipelining, and/or multithreading.

For example, the processor 313 may be embodied as one or more complex programmable logic devices (CPLDs), microprocessors, multi-core processors, co-processing entities, application-specific instruction-set processors (ASIPs), and/or controllers. Further, the processor 313 may be embodied as one or more other processing devices or circuitry. The term circuitry may refer to an entirely hardware embodiment or a combination of hardware and computer program products. Thus, the processor 313 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 313 may be configured for a particular use or configured to execute instructions stored in volatile or non-volatile media or otherwise accessible to the processor 313. As such, whether configured by hardware or computer program products, or by a combination thereof, the processor 313 may be capable of performing steps or operations according to embodiments of the present invention when configured accordingly.

The use of the terms "processing circuitry" or "processor" may be understood to include a single core processor, a multi-core processor, multiple processors internal to the apparatus, and/or remote or "cloud" processors.

In some embodiments, the memory 315 stores non-transitory program codes or non-transitory program instructions. In some embodiments, the memory 315 may comprise volatile storage or memory such as, but not limited to, random-access memory (RAM), dynamic random access memory (DRAM), static random access memory (SRAM), fast page mode dynamic random access memory (FPM DRAM), extended data out DRAM (EDO DRAM), synchronous DRAM (SDRAM), double data rate SDRAM (DDR SDRAM), double data rate 2 SDRAM (DDR2 SDRAM), double data rate 3 SDRAM (DDR3 SDRAM), Rambus DRAM (RDRAM), Rambus inline memory module (RIMM), dual in-line memory module (DIMM), single in-line memory module (SIMM), video random access memory (VRAM), cache memory, register memory, and/or the like. Additionally, or alternatively, the memory 315 may comprise non-volatile storage or memory such as, but not limited to, hard disks, read-only memory (ROM), programmable ROM (PROM), erasable programmable ROM (EPROM), electrically erasable programmable ROM (EEPROM), flash memory, SD memory cards, memory sticks, conductive-bridging RAM (CBRAM), parameter RAM (PRAM), ferroelectric RAM (FeRAM), resistive RAM (RRAM), SONOS, racetrack memory, and/or the like. Additionally, or alternatively, the memory 315 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In some embodiments, the processor 313 may be configured to execute instructions stored in the memory 315 or otherwise accessible to the processor. Alternatively, or additionally, the processor 313 may be configured to execute hard-coded functionality. As such, whether configured by hardware or software methods, or by a combination thereof, the processor 313 may represent an entity (e.g., physically embodied in circuitry) capable of performing operations according to an embodiment of the present disclosure while configured accordingly. Additionally, or alternatively, when the processor 313 is embodied as an executor of software instructions, the instructions may specifically configure the processor to perform the algorithms and/or operations described herein when the instructions are executed.

In some embodiments, the memory 315 and the non-transitory program code are configured to, with the processor 313, cause the main controller component 311 to execute one or more methods and/or operations of method(s) described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the main controller component 311 is electronically coupled to one or more other electronic components on the circuit board component 301. In the example shown in FIG. 3, the main controller component 311 is electronically coupled to, such as but not limited to, the analog-to-digital converter component 317.

In some embodiments, the analog-to-digital converter component 317 translates/converts analog signals from other components into digital signals for the main controller component 311. For example, the analog-to-digital converter component 317 converts, such as but not limited to, signals from the air quality sensor component 303, signals from the pressure sensor component 305, signals from the fan component 307, signals from sound sensor component 309, and/or the like. Examples of the analog-to-digital converter component 317 include, but not limited to, successive approximation (SAR) analog-to-digital converters, delta-sigma analog-to-digital converters, dual slope analog-to-digital converters, pipelined analog-to-digital converters, and/or the like.

In some embodiments, the data communication component 319 may be any means such as a device or circuitry embodied in either hardware or a combination of hardware and software that is configured to receive and/or transmit data from/to a network and/or any other device, circuitry, or module in communication with the main controller component 311. In this regard, the data communication component 319 may include, for example, a network interface for enabling communications with a wired or wireless communication network. For example, the data communication component 319 may include one or more network interface cards, antennae, buses, switches, routers, modems, and supporting hardware and/or software, or any other device suitable for enabling communications via a network. Additionally, or alternatively, the data communication component 319 may include the circuitry for interacting with the antenna/antennae to cause transmission of signals via the antenna/antennae or to handle receipt of signals received via the antenna/antennae.

In some embodiments, the data communication component 319 communicates data, content, information, and/or similar terms used herein interchangeably that can be transmitted, received, operated on, processed, displayed, stored, and/or the like to and/or from the main controller component 311.

In some embodiments, such communications can be executed by using any of a variety of wireless communication protocols such as, but not limited to, Bluetooth protocols, near field communication (NFC) protocols, general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, Wibree, wireless universal serial bus (USB) protocols, and/or any other wireless protocol.

Additionally, or alternatively, such communications can be executed by using any of a variety of wired communication protocols, but not limited to, such as fiber distributed data interface (FDDI), digital subscriber line (DSL), Ethernet, asynchronous transfer mode (ATM), frame relay, data over cable service interface specification (DOCSIS), or any other wired transmission protocol.

In accordance with some embodiments of the present disclosure, one or more electronic components in the example mask component (such as, but not limited to, sensor components, fan components, and/or the like) are electronically coupled to one or more electronic components on the circuit board component 301 (such as, but not limited to, the main controller component 311, the analog-to-digital converter component 317, and/or the like).

In some embodiments, the one or more electronic components in the example mask component are electronically coupled to the one or more electronic components on the circuit board component 301 through wired means, and can transmit data to and receive data from electronic components on the circuit board component 301 (such as, but not limited to, the main controller component 311, the analog-to-digital converter component 317, and/or the like). Additionally, or alternatively, the one or more electronic components in the example mask component are electronically coupled to the one or more electronic components on the circuit board component 301 through wireless means.

In the example shown in FIG. 3, one or more pressure sensor components (such as, but not limited to, the pressure sensor component 305) are in electronic communication with the circuit board component 301 (such as, but not limited to, the main controller component 311, the analog-to-digital converter component 317, and/or the like). For example, the pressure sensor component 305 may transmit air pressure signals indicating the detected air pressure to the main controller component 311 or the analog-to-digital converter component 317. In some embodiments, each of the air pressure signals may comprise an air pressure value that corresponds to the air pressure in the enclosed space as defined by the face seal component 218 and the inner shell component 216.

Additionally, or alternatively, the one or more humidity sensor components and/or one or more air quality sensor components (such as, but not limited to, the air quality sensor component 303) are in electronic communication with the circuit board component 301 (such as, but not limited to, the main controller component 311, the analog-to-digital converter component 317, and/or the like). For example, each of the one or more humidity sensor components can transmit humidity indications indicating the detected humidity levels (for example, relative humidity levels) to the main controller component 311 or the analog-to-digital converter component 317. Additionally, or alternatively, each of the one or more air quality sensor components can transmit air quality indications (such as, but not limited to, VOC concentration indications, oxygen concentration indications, carbon dioxide concentration indications, and/or the like) to the main controller component 311 or the analog-to-digital converter component 317.

Additionally, or alternatively, the one or more fan components (such as, but not limited to, the fan component 307) are in electronic communication with the circuit board component 301 (such as, but not limited to, the main controller component 311, the analog-to-digital converter component 317, and/or the like). In some embodiments, the main controller component 311 is electronically coupled to at least one fan component. For example, each of the one or more fan components can generate and transmit fan speed signals (e.g., comprising a rotation speed indication associated with the corresponding fan component) to the main controller component 311, the analog-to-digital converter component 317, and/or the like.

While the description above provides example sensor components that are in data communications with the main controller component, it is noted that the scope of the present disclosure is not limited to the description above. In some examples, one or more other sensor components may additionally or alternatively be in electronic communications with the main controller component.

In the example shown in FIG. 3, the example respiratory protective device 300 comprises an audio controller component 321.

In some embodiments, the audio controller component 321 comprises a processor 323 and a memory 325. In some embodiments, the processor 323 is similar to the processor 313 described above. In some embodiments, the memory 325 is similar to the memory 315 described above.

In some embodiments, the audio controller component 321 is in electronic communication with at least one sound sensor component (such as, but not limited to, the sound sensor component 309) and the main controller component 311.

In some embodiments, one or more sound sensor components (such as, but not limited to, the sound sensor component 309) are in electronic communication with the circuit board component 301 (such as, but not limited to, the main controller component 311, the analog-to-digital converter component 317, audio controller component 321, and/or the like). For example, each of the one or more sound sensor components can generate and transmit sound signals to the audio controller component 321. In such an example, the audio controller component 321 receives the detected sound signal from the at least one sound sensor component (such as, but not limited to, the sound sensor component 309) and transmits the detected sound signal to the main controller component 311.

Figure 4:
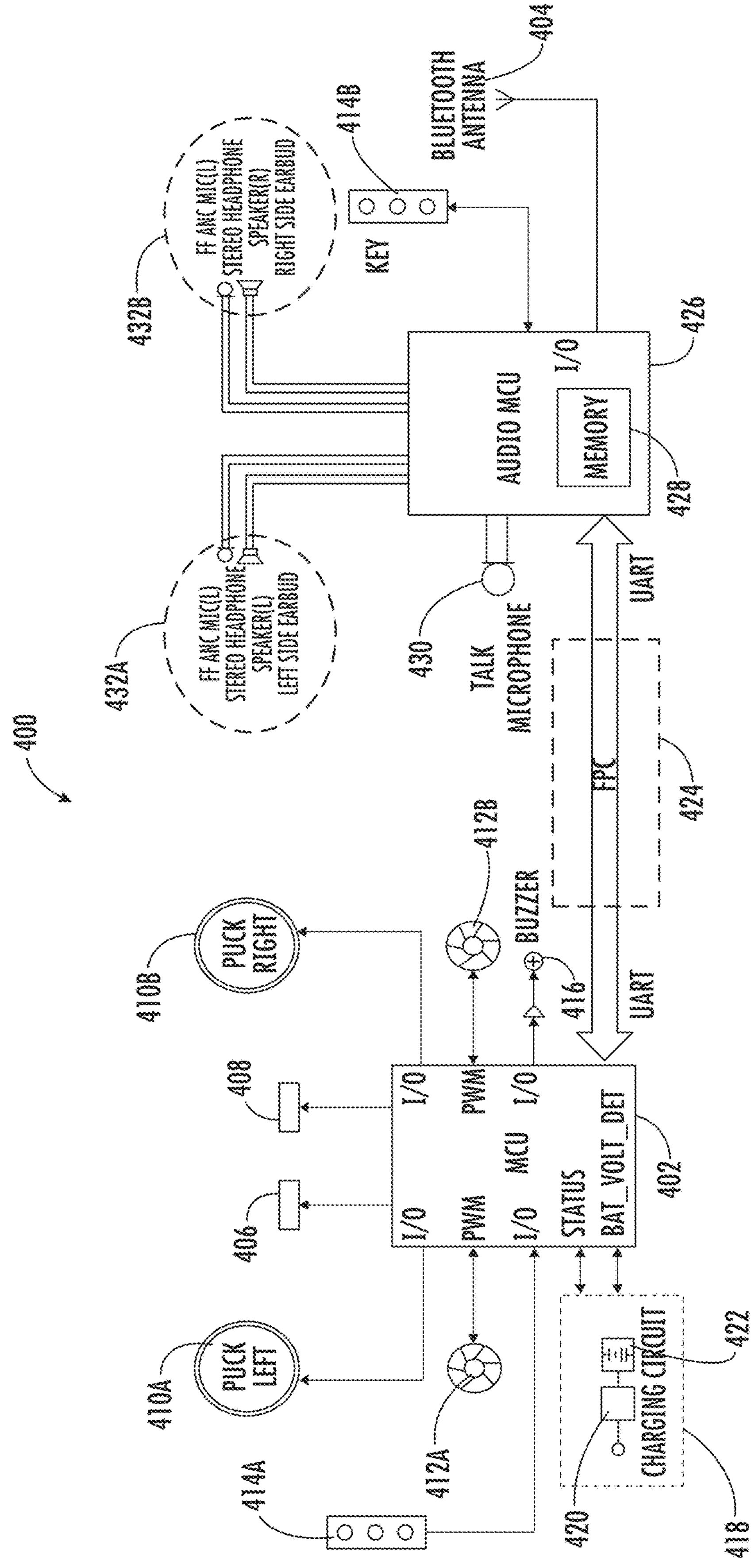
FIG. 4 provides an example circuit diagram illustrating example data communications between example components of an example respiratory protective device in accordance with some example embodiments described herein.

Referring now to FIG. 4, an example circuit diagram illustrating example components of an example respiratory protective device 400 in accordance with some example embodiments is illustrated. In the example shown in FIG. 4, the example respiratory protective device 400 comprises a main controller component 402, similar to the example main controller components described above.

In some embodiments, the main controller component 402 is electronically coupled to one or more other electronic components. In the example shown in FIG. 4, the main controller component 402 is electronically coupled to components such as, but not limited to, a pressure sensor component 406, an air quality sensor component 408, one or more light components (such as, but not limited to, a light component 410A and a light component 410B), one or more fan components (such as, but not limited to, a fan component 412A and a fan component 412B), the key component 414A, and/or the buzzer circuit 416.

In some embodiments, the pressure sensor component 406 may transmit air pressure signals to the main controller component 402. As described above, each of the air pressure signals may comprise an air pressure value that corresponds to the air pressure in the enclosed space as defined by the face seal component 218 and the inner shell component 216.

In some embodiments, the air quality sensor component 408 may transmit air quality indications to the main controller component 402. As described above, the air quality indications may indicate, for example, but not limited to, VOC concentration indications, oxygen concentration indications, carbon dioxide concentration indications, and/or the like.

While the description above provides an example air quality sensor component, it is noted that the scope of the present disclosure is not limited to the description above. In some examples, one or more humidity sensor components are electronically coupled to the main controller component 402 in addition to or in alternative of the air quality sensor component. For example, each of the one or more humidity sensor components may generate humidity indications that indicate relative humidity levels within the enclosed space defined by the face seal component and the inner shell component of the respiratory protective device on at least a portion of the user's face, similar to those described above.

In some embodiments, each of the one or more the light components (such as, but not limited to, the light component 410A and the light component 410B) may be in the form of one or more light-emitting diode (LED) rings that are disposed on one or more puck components (for example, on the left puck component and the right puck component). For example, the light component 410A may be disposed on the left puck component and the light component 410B may be disposed on the right puck component. In some embodiments, the main controller component 402 may transmit control signals to the one or more light components so as to adjust the color and/or intensity of light emitted by the one or more light components.

In some embodiments, each of the one or more fan components (such as, but not limited to, the fan component 412A and/or the fan component 412B) can generate and transmit fan speed signals (e.g., comprising a rotation speed indication associated with the corresponding fan component) to the main controller component 402. In some embodiments, the main controller component may transmit a fan component activation signal to a fan component (e.g., the fan component 412A and/or the fan component 412B) that causes the fan component to start operating In some embodiments, the main controller component may transmit a fan component deactivation signal to the fan component that causes a fan component (e.g., the fan component 412A and/or the fan component 412B) to stop operating. In some embodiments, the main controller component may transmit a forward rotation start signal to a fan component (e.g., the fan component 412A and/or the fan component 412B) that causes the fan component to start forward rotation. In some embodiments, the main controller component may transmit a reverse rotation start signal to a fan component (e.g., the fan component 412A and/or the fan component 412B) that causes the fan component to start reverse rotation.

In some embodiments, the main controller component 402 is in electronic communications with the key component 414A. For example, when a user presses a button on the key component 414A, the key component 414A may transmit a corresponding signal to the main controller component 402. In such an example, based on which button that the user presses, the main controller component 402 triggers one or more operations associated with other components of the respiratory protective device 400 and/or one or more earpiece devices associated with the respiratory protective device 400 (such as, but not limited to, adjusting the volume, triggering noise canceling mode, and/or the like).

In some embodiments, the light component 410A and the light component 410B may be in the form of one or more light-emitting diode (LED) rings that are disposed on one or more puck components (for example, on the right puck component). In some embodiments, the main controller component 402 may transmit control signals to the light component 410A and/or the light component 410B through so as to adjust the color and/or intensity of the light emitted by the light component 410A and the light component 410B.

In some embodiments, the main controller component 402 is in electronic communication with the buzzer circuit 416. For example, the main controller component 402 may transmit control signals to the buzzer circuit 416 so as to trigger an alarm sound.

In some embodiments, the respiratory protective device 400 comprises a power charging component 418. In the example shown in FIG. 4, the power charging component 418 comprises a device power source component 420 and a power charging circuit component 422.

Similar to those described above, the device power source component 420 may be in the form of, such as but not limited to, one or more batteries. In some embodiments, the power charging circuit component 422 may be electronically coupled to the device power source component 420 and the main controller component 402. In such an example, the power charging circuit component 422 transfers electrical energy from the device power source component 420 to the main controller component 402. For example, the power charging circuit component 422 may comprise one or more voltage regulators so that a constant voltage can be provided to the main controller component 402. Additionally, or alternatively, the power charging circuit component 422 may comprise one or more voltage divider circuits so that a suitable voltage can be provided to the main controller component 402.

In some embodiments, subsequent to receiving electrical energy from the device power source component 420 and/or the power charging circuit component 422, the main controller component 402 transfers electrical energy to other electronic components (such as, but not limited to, the fan component 412A, the fan component 412B, the light component 410A, the light component 410B, and/or the like).

In some embodiments, the example respiratory protective device 400 comprises an audio controller component 426. Similar to those described above in connection with at least FIG. 3, the audio controller component 426 is in electronic communication with the main controller component 402.

In the example shown in FIG. 4, the main controller component 402 and the audio controller component 426 are connected through a flexible printed circuit (FPC) connectors 424 For example, the main controller component 402 is electronically coupled to a first FPC connector, and the audio controller component 426 is electronically coupled to a second FPC connector. In such an example, the first FPC connector is electronically coupled to the second FPC connector so that the main controller component 402 and the audio controller component 426 are electronically coupled to one another.

In some embodiments, the FPC connectors 424 can enable component-to-component digital communications (for example, based on universal asynchronous receiver/transmitter (UART) protocols, Inter-Integrated Circuit (I2C) protocols, and/or the like) between the main controller component 402 and the audio controller component 426. As an example, the FPC connectors 424 may enable data communications based on the UART protocol, such that parallel data communications are converted into serial data communications, thereby reducing the need for providing a higher bandwidth for data communications between the main controller component 402 and the audio controller component 426.

While the description above provides an example connection between the main controller component and the audio controller component, it is noted that the scope of the present disclosure is not limited to the example above. In some embodiments, an example main controller component and an example audio controller component may be connected through other mechanisms.

In some embodiments, the audio controller component 426 is electronically coupled to one or more other electronic components. In the example shown in FIG. 4, the audio controller component 426 is electronically coupled to components such as, but not limited to, one or more earpiece devices (such as, but not limited to, the earpiece device 432A and the earpiece device 432B), one or more sound sensor components (such as, but not limited to, the sound sensor component 430), the key component 414B, and/or a data communication component 404.

In some embodiments, each of the one or more earpiece devices (such as, but not limited to, the earpiece device 432A and the earpiece device 432B) comprises an earbud housing, a speaker, and/or an ANC microphone. For example, the earpiece device 432A corresponds to a left side earbud with an earbud housing that includes a left side stereo headphone speaker disposed within the earbud housing and/or a left ANC microphone for conducting active noise cancellation. Similarly, the earpiece device 432B corresponds to a right side earbud with an earbud housing that includes a right side stereo headphone speaker disposed within the earbud housing and/or a right ANC microphone for conducting active noise cancellation.

In some embodiments, when a user uses the example respiratory protective device 400 to conduct voice calls, the one or more earpiece devices (such as, but not limited to, the earpiece device 432A and the earpiece device 432B) provide audio outputs.

In some embodiments, the sound sensor component 430 can generate and transmit sound signals to the audio controller component 426. In some embodiments, the audio controller component 426 may transmit control signals (such as, but not limited to, sound sensor activation signals) to the sound sensor component 430 through the data communication component 404.

In some embodiments, the audio controller component 426 is in electronic communications with the key component 414B. For example, when a user presses a button on the key component 414B, the key component 414B may transmit a corresponding signal to the audio controller component 426. In such an example, based on which button that the user presses, the audio controller component 426 triggers one or more operations associated with other components of the respiratory protective device 400 and/or one or more earpiece devices associated with the respiratory protective device 400 (such as, but not limited to, adjusting the volume, triggering noise canceling mode, and/or the like).

Similar to those described above, the data communication component 404 comprises hardware or a combination of hardware and software that receives and/or transmits data from/to a network, any other device, circuitry, module, and/or the like. As an example, the data communication component 404 may be in the form of a Bluetooth® chip that comprises a radio frequency (RF) transceiver for sending and receiving communications in the 2.4 GHz industrial, scientific, and medical (ISM) radio frequency band. In the example shown in FIG. 4, the data communication component 404 comprises a Bluetooth antenna. Additionally, or alternatively, the data communication component 404 may be in other forms.

Similar to those described above in connection with FIG. 3, the audio controller component 426 comprises a memory 428. In some embodiments, the memory 428 of the audio controller component 426 stores noise profile data objects associated with the respiratory protective device 400. For example, the audio controller component 426 may generate and store the noise profile data objects in the memory 428.

In some embodiments, the audio controller component 426 receives detected fan speed signals that indicate speeds of fan components of the respiratory protective device 400 (for example, the pulse width modulations (PWMs) associated with the fan component 412A and the fan component 412B). In some embodiments, fan speed signals are transmitted to the audio controller component 426 at runtime, and the audio controller component 426 selects noise profile data objects from the memory 428 that correspond to the fan speed signals.

In some embodiments, the audio controller component 426 further receives detected sound signals from the sound sensor component 309. In some embodiments, based at least in part on the selected noise profile data objects, the audio controller component 426 applies noise reduction algorithms on the detected sound signals to generate noise-reduced sound signals (e.g., sound signals that comprise a user's voice without noises from the fan components). In some embodiments, the audio controller component 426 transmits the noise-reduced sound signals to the data communication component 319.

As such, various embodiments of the present disclosure can generate sound signals with effective noise reduction, additional details of which are described herein.

Figure 5:
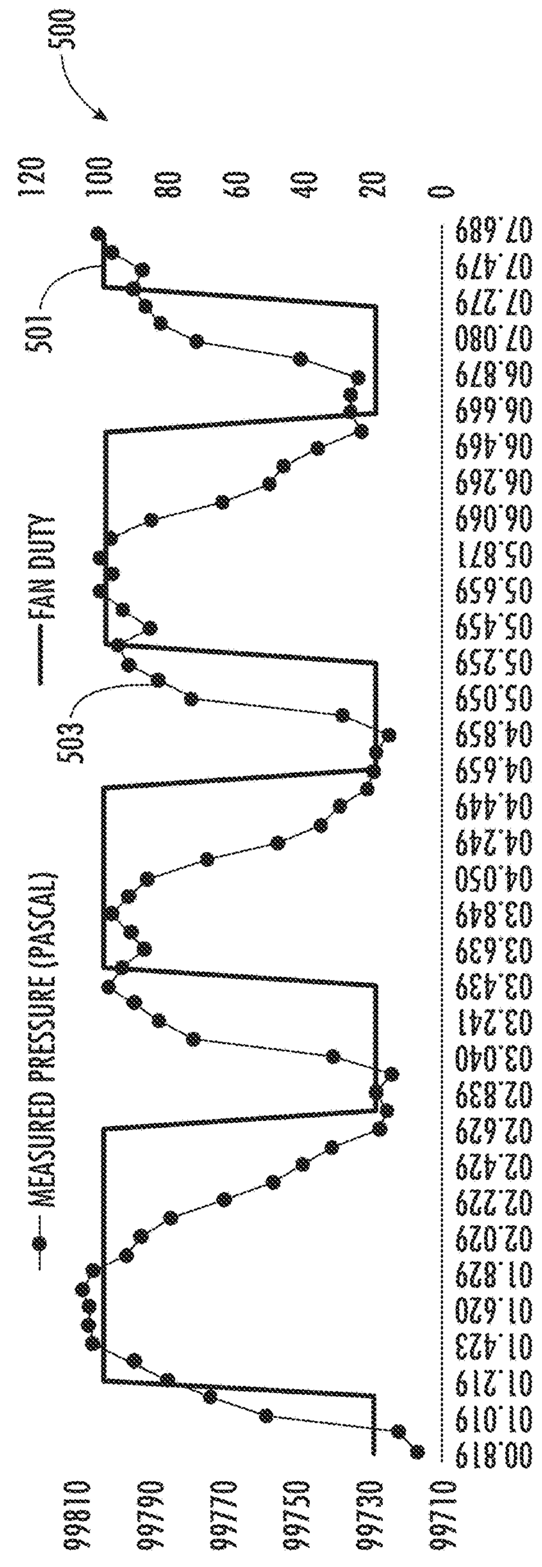
FIG. 5 provides an example diagram illustrating example rotation speed indications and example air pressure values associated with an example respiratory protective device in accordance with some embodiments of the present disclosure.

Referring now to FIG. 5, an example diagram 500 illustrates example rotation speed indications 501 from fan speed signals and example air pressure values 503 from air pressure signals associated with an example respiratory protective device in accordance with some embodiments of the present disclosure.

As described above, the air pressure signals may comprise air pressure values 503 that correspond to the air pressure in the enclosed space as defined by the face seal component and the inner shell component of the example respiratory protective device. For example, when a user wearing the example respiratory protective device inhales, the air pressure values 503 decrease. When a user wearing the example respiratory protective device exhales, the air pressure values 503 increase. As such, based on the air pressure values 503 from the air pressure signals, the breathing pattern of the user wearing the example respiratory protective device can be determined.

As described above, the example respiratory protective device comprises one or more fan components that are triggered automatically based on the breathing patterns of the user. For example, when the user inhales, the fan component may be activated, and/or the rotation speed indications 501 of the fan component may be increased so as to facilitate the user's breathing in. When the user exhales, the fan component may be deactivated, and/or the rotation speed indications 501 of the fan component may be decreased so as to facilitate the user's breathing out. Because the breathing patterns of the user can be determined based on the air pressure values 503, there are correlations between example rotation speed indications 501 from fan speed signals and example air pressure values 503 from air pressure signals as shown in FIG. 5.

Figure 6:
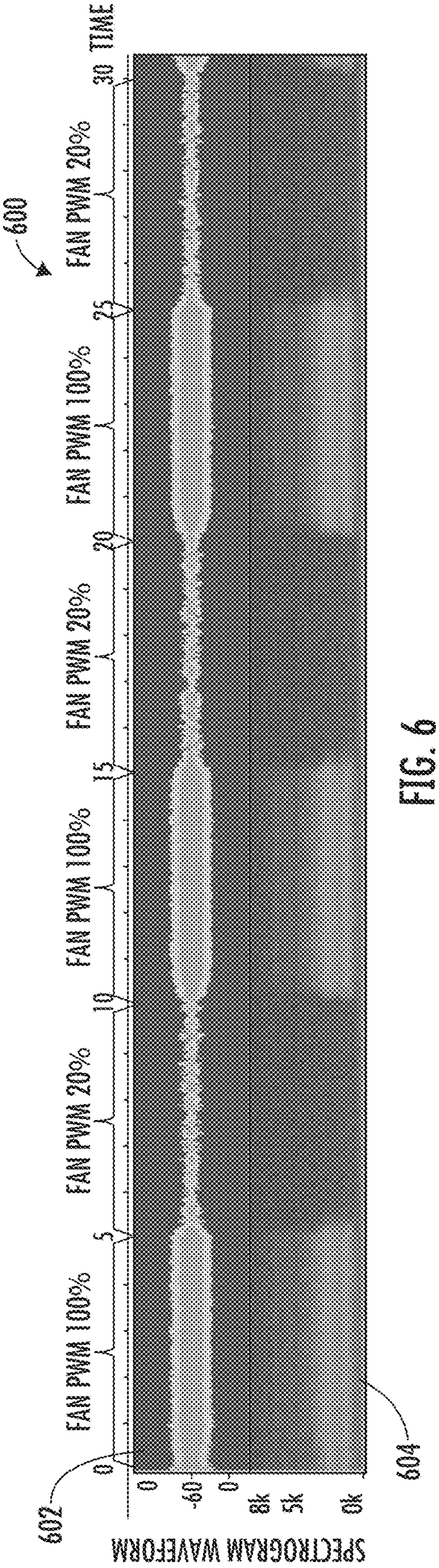
FIG. 6 provides an example diagram illustrating example detected sound signals associated with an example respiratory protective device in the forms of example waveforms and example spectrograms.

Referring now to FIG. 6, an example diagram 600 illustrates example detected sound signals associated with an example respiratory protective device in accordance with some embodiments of the present disclosure.

In the example shown in FIG. 6, the example detected sound signals are represented in the forms of waveforms 602 (e.g., representing the detected sound as sound waves) and spectrograms 604 (e.g., representing the strength or "loudness" of the detected sound signal). Further, the waveforms 602 and the spectrograms 604 are correlated to the detected rotation speed indications associated with the fan components of the example respiratory protective device.

As shown in the FIG. 6, the higher the fan speed as indicated by the detected rotation speed indications, the more noise produced by the fan components. For example, when the detected rotation speed indications show that the fan components are operating at 100% pulse width modulation (PWM) (e.g., 100% of the full speed), the noises from the fan components can have significant impacts on the voice captured by the sound sensor component of the example respiratory protective device. As described above, the rotational speed of the fan component increases when the user inhales. As such, it is important to increase the level of noise reduction when the user inhales.

Figure 7:
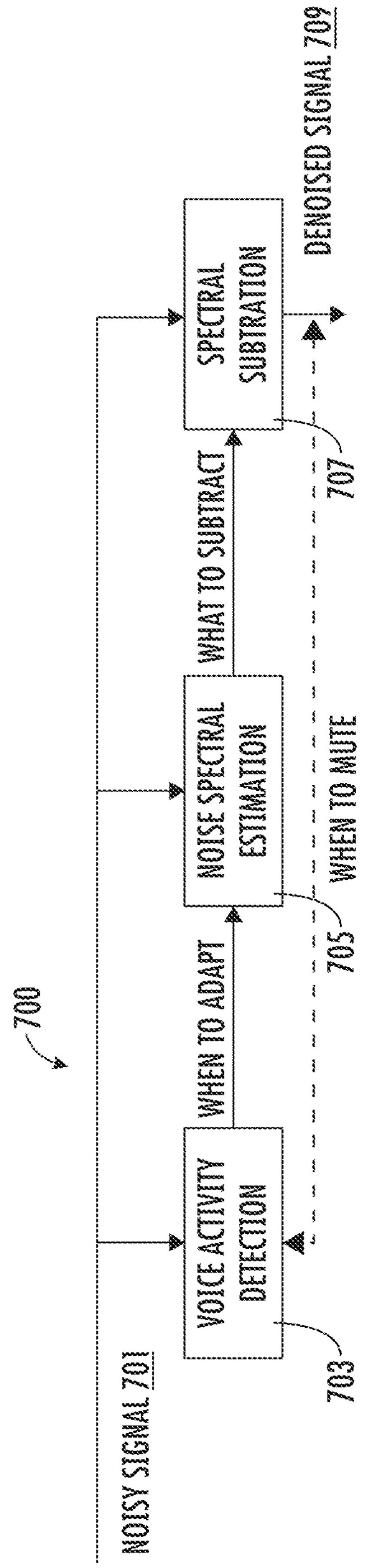
FIG. 7 provides an example flow diagram illustrating an example noise reduction algorithm.
Figure 8:
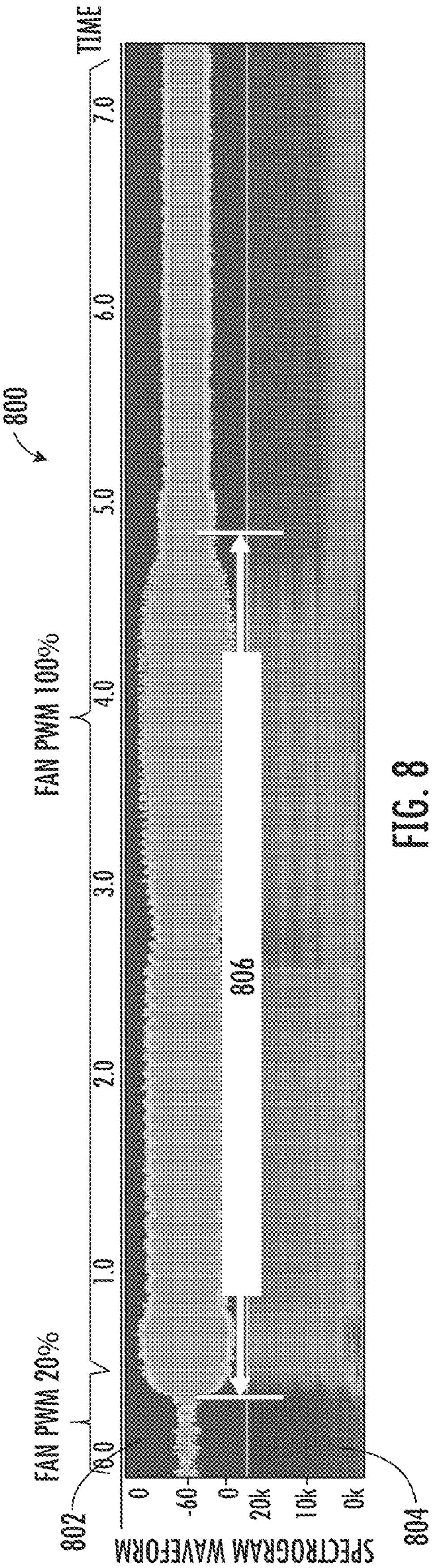
FIG. 8 provides an example diagram illustrating example sound signals associated with an example respiratory protective device in the forms of example waveforms and example spectrograms.

Referring now to FIG. 7, an example flow diagram illustrating an example noise reduction algorithm 700 is provided. FIG. 8 provides an example diagram 800 illustrating example sound signals associated with an example respiratory protective device based on the example noise reduction algorithm 700 shown in FIG. 7.

In the example shown in FIG. 7, the example noise reduction algorithm 700 comprises a voice activity detection module 703, a noise spectral estimation module 705, and a spectral subtraction model 707. For example, the noisy signal 701 representing the detected sounds (including noise) is provided to the voice activity detection module 703, the noise spectral estimation module 705, and the spectral subtraction model 707.

The voice activity detection module 703 determines whether the noisy signal 701 comprises any audio signal that should be maintained or kept. For example, the voice activity detection module 703 may determine whether the noisy signal 701 comprises a voice signal associated with a user.

If the noisy signal 701 does not comprise any audio signal that should be maintained or kept (e.g., the noisy signal 701 comprises entirely of noise), the voice activity detection module 703 generates the denoised signal 709 by removing the noisy signal 701 entirely (e.g., "muting" the signal).

If the noisy signal 701 comprises audio signals that should be maintained or kept (e.g., the noisy signal 701 comprises a user's voice signal), the voice activity detection module 703 instructs the noise spectral estimation module 705 to adapt and estimate the spectral noise signal from the noisy signal 701. In other words, the noise spectral estimation module 705 estimates which spectral portion of the noisy signal 701 is the noise portion that should be eliminated. After estimating the spectral noise signal from the noisy signal 701, the noise spectral estimation module 705 provides the spectral noise signal to the spectral subtraction model 707, and the spectral subtraction model 707 substrates the spectral noise signal from the noisy signal 701 to produce a denoised signal 709.

Because the example noise reduction algorithm 700 relies on the noise spectral estimation module 705, the example noise reduction algorithm 700 may be suitable for implementations where the background noise remains constant (such as, but not limited to, when the detected sound signals are from the office or from the street). In particular, it takes some time for the noise spectral estimation module 705 to estimate the noise portion from the noisy signal 701. FIG. 8 illustrates such technical disadvantages of the example noise reduction algorithm 700.

In the example shown in FIG. 8, example waveforms 802 and example spectrograms 804 represent example sound signals when the example noise reduction algorithm 700 shown in FIG. 7 is applied. As shown in FIG. 8, the detected rotation speed indications show that the increase of the rotational speed of the fan components from 20% PWM (e.g., 20% of the full speed) to 100% PWM (e.g., 100% of the full speed) causes a significant increase in the noise produced by the fan components. Even though the example noise reduction algorithm 700 is applied, the example noise reduction algorithm 700 is unable to remove noise from the sound signals during the portion 806 of the example waveforms 802 and the example spectrograms 804, as it takes approximately 4 seconds for the example noise reduction algorithm 700 (including the voice activity detection module 703, the noise spectral estimation module 705, and the spectral subtraction model 707) to remove noise from sound signals.

As described above, adjustments of the fan speed may follow the breathing pattern of the users. For example, a user may breathe every 2 to 3 seconds. A normal breath pattern includes 16 to 20 breaths per minute, while a breathing pattern when a user is running includes 30 to 40 breaths per minute. Accordingly, an example respiratory protective device may adjust the fan speed associated with the fan component to match the breathing pattern. For example, an example respiratory protective device may increase the fan speed to 100% (e.g., during the user's inhalation) and may decrease the fan speed to 20% (e.g., during the user's exhalation) every 2 to 3 seconds. Because it takes approximately 4 seconds for the example noise reduction algorithm 700 to remove noise from sound signals, the example noise reduction algorithm 700 cannot be implemented to remove noise from sounds signals associated with an example respiratory protective device in accordance with some embodiments of the present disclosure.

Various embodiments of the present discourse overcome the above technical challenges and difficulties, and provide various technical improvements and advantages. For example, various embodiments of the present disclosure pre-generate a plurality of noise profile data objects associated with a plurality of detected rotation speed indication.

Referring now to FIG. 9A to FIG. 11C, example detected sound signals in the forms of example spectrograms in accordance with some embodiments of the present disclosures are provided. In some embodiments, FIG. 9A to FIG. 11C provide example representations of noises from the fan components of the example respiratory protective device when the fan components operate at different rotational speeds and/or when the noises are measured at different measurement times.

Figure 9A:
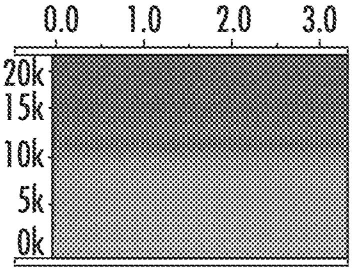
FIG. 9A, FIG. 9B, and FIG. 9C illustrate example detected sound signals in the forms of example spectrograms in accordance with some embodiments of the present disclosure.
Figure 9B:
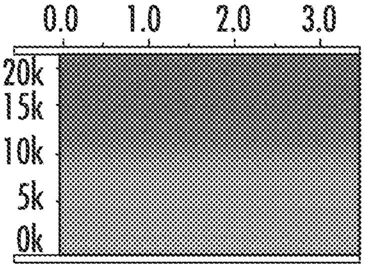
Figure 9C:
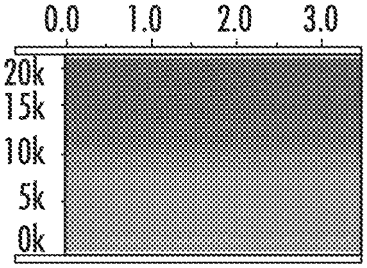

In particular, FIG. 9A, FIG. 9B, and FIG. 9C illustrate example spectrograms of only noises from fan components when the fan components are operating at 95% PWM. Each of the example spectrograms shown in FIG. 9A, FIG. 9B, and FIG. 9C is generated based on the detected sound signals at a different measurement time. Comparing FIG. 9A, FIG. 9B, and FIG. 9C, noises from the fan components operating at 95% PWM are consistent among the three different measurement times.

Figure 10A:
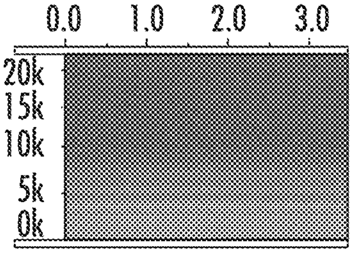
FIG. 10A, FIG. 10B, and FIG. 10C illustrate example detected sound signals in the forms of example spectrograms in accordance with some embodiments of the present disclosure.
Figure 10B:
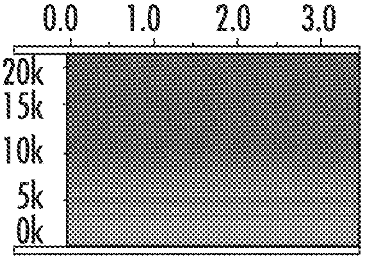
Figure 10C:
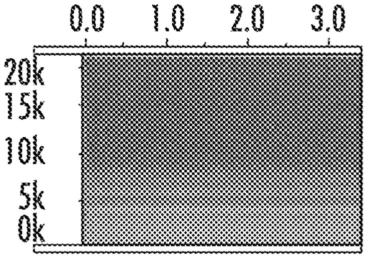

FIG. 10A, FIG. 10B, and FIG. 10C illustrate example spectrograms of only noises from fan components when the fan components are operating at 65% PWM. Each of the example spectrograms shown in FIG. 10A, FIG. 10B, and FIG. 10C is generated based on the detected sound signals at a different measurement time. Comparing FIG. 10A, FIG. 10B, and FIG. 10C, noises from the fan components operating at 65% PWM are consistent among the three different measurement times.

Figure 11A:
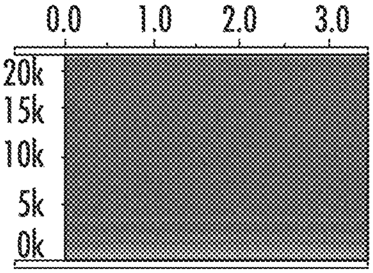
FIG. 11A, FIG. 11B, and FIG. 11C illustrate example detected sound signals in the forms of example spectrograms in accordance with some embodiments of the present disclosure.
Figure 11B:
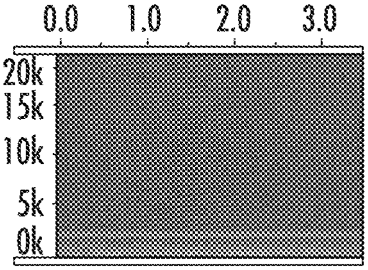
Figure 11C:
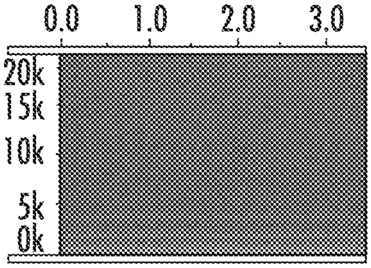

FIG. 11A, FIG. 11B, and FIG. 11C illustrate example spectrograms of only noises from fan components when the fan components are operating at 35% PWM. Each of the example spectrograms shown in FIG. 11A, FIG. 11B, and FIG. 11C is generated based on the detected sound signals at a different measurement time. Comparing FIG. 11A, FIG. 11B, and FIG. 11C, noises from the fan components operating at 35% PWM are consistent among the three different measurement times.

As illustrated in FIG. 9A to FIG. 11C, fan noise spectrums are similar to one another when the fan component operates at a particular speed. As such, various embodiments of the present discourse generate a plurality of noise profile data objects associated with a plurality of rotation speed indications based on, for example, the fan noise spectrums as shown in FIG. 9A to FIG. 11C. In some embodiments, each of the plurality of noise profile data objects provides an noise spectral estimation associated with the fan component when the fan component operates at a particular speed.

In some embodiments, the plurality of noise profile data objects are generated prior to run time (for example, prior to the user wearing the respiratory protective device to conduct a telephone call). During run time, various embodiments of the present disclosure may determine the current speed of the fan component based on the rotation speed indication from the fan speed signal, retrieve the noise profile data object corresponding to the current speed of the fan component, and apply noise suppression algorithms based on the retrieved noise profile data object to perform noise reduction and generate denoised sound signals (for example, as audio signals for a telephone call). By separating noise spectral estimation (e.g., generating noise profile data objects prior to runtime) and noise reduction (e.g., generating noise-reduced sound signals during run time) to the different phases, various embodiments of the present disclosure can provide immediate denoising performance (in contrast with delay and latency caused by the example noise reduction algorithm shown above in connection with FIG. 7).

Figure 12:
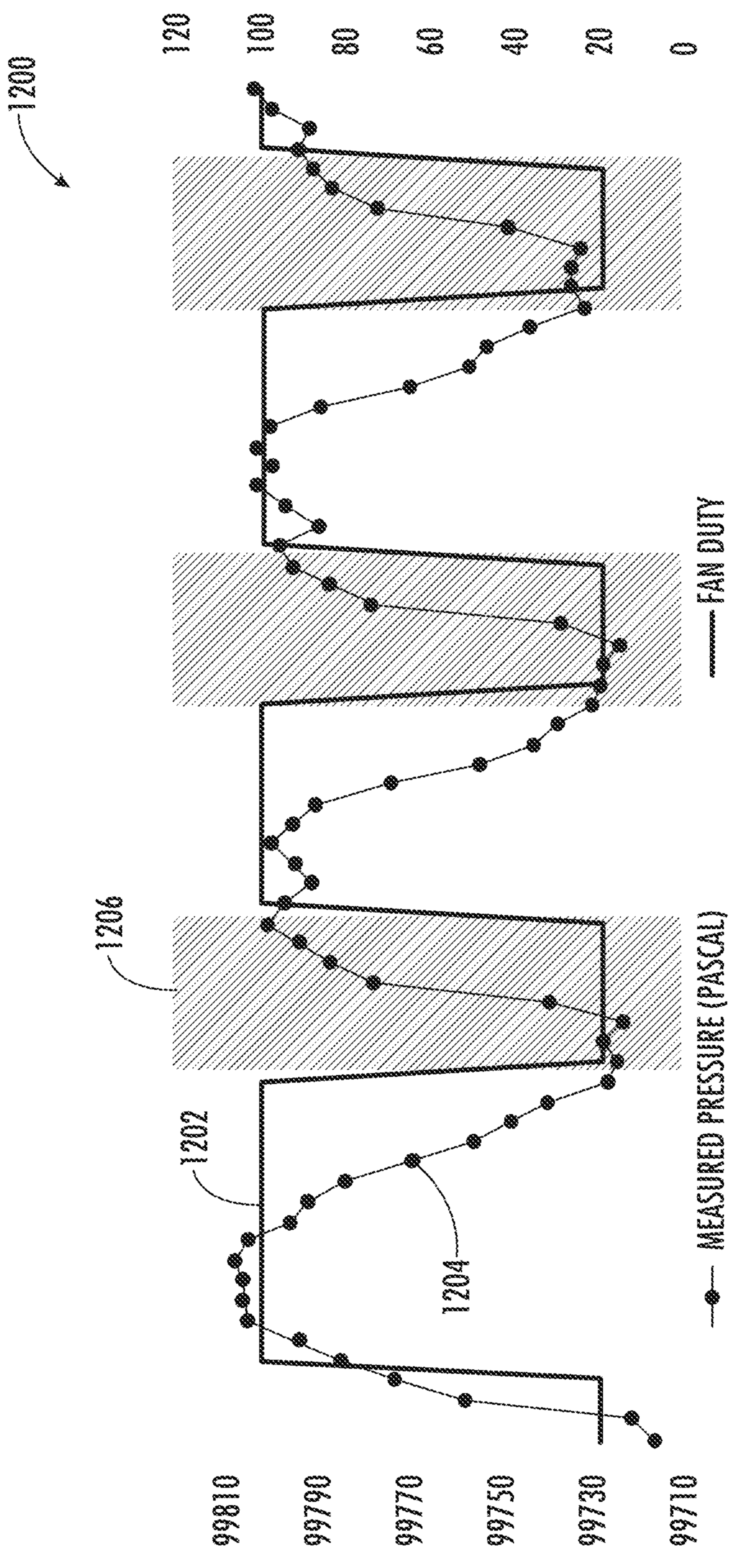
FIG. 12 provides an example diagram illustrating example rotation speed indications and example air pressure values associated with an example respiratory protective device in accordance with some embodiments of the present disclosure.

FIG. 12 provides an example diagram 1200 illustrating example rotation speed indications 1202 and example air pressure values 1204 associated with an example respiratory protective device in accordance with some embodiments of the present disclosure.

As described above, the breathing pattern of the user (e.g., inhalation and exhalation) can be determined based on the example air pressure values 1204. For example, when the user inhales, the example air pressure values 1204 decrease. When the user exhales, the example air pressure values 1204 increase. In some embodiments, the operations of the fan components may be triggered based on the breathing pattern of the user. For example, the example rotation speed indications 1202 may increase prior to the inhalation of the user, such that the fan component can blow more air into the respiratory protective device. As another example, the example rotation speed indications 1202 may decrease prior to the exhalation of the user, such that the fan component can stop blowing air into the respiratory protective device.

In some embodiments, when the fan is operating at a high speed (for example, when the example rotation speed indications 1202 indicate a speed of more than 40% PWM), the majority of noise inside the enclosed space of the respiratory protective device comes from the fan component.

In some embodiments, when the fan is operating at a low speed (for example, when the example rotation speed indications 1202 indicate a speed of less than 40% PWM) as shown in area 1206 of FIG. 12, the noise inside the enclosed space of the respiratory protective device mostly comes from the exhalation of the user. In particular, the exhalation can have a significant impact on voice capture as the exhaled air that flows in the enclosed space of the respiratory protective device can blow into the sound sensor component.

In some embodiments, a controller component may generate a plurality of noise profile data objects based on breath phases (such as, but not limited to, inhalation and exhalation) associated with the user prior to runtime. During runtime, the controller component determines the current breath phase based on speed signals associated with the fan component, and applies the noise suppression algorithm on the breath noise to output denoised voice for telephone calls.

Various embodiment of the present disclosure can determine and/or measure internal noise from the respiratory protective device in advance based at least in part on the fan control signals, and then can suppress internal noise to produce noise-reduced signals, providing technical benefits and advantages such as, but not limited to, fine granularity of noise reduction based on breath pattern to decrease the impact of breath (especially exhalation) on the voice capture.

Referring now to FIG. 13 to FIG. 22, example diagrams illustrating example methods in accordance with various embodiments of the present disclosure are illustrated.

It is noted that each block of the flowchart, and combinations of blocks in the flowchart, may be implemented by various means such as hardware, firmware, circuitry and/or other devices associated with execution of software including one or more computer program instructions. For example, one or more of the steps/operations described in FIG. 13 to FIG. 22 may be embodied by computer program instructions, which may be stored by a non-transitory memory of an apparatus employing an embodiment of the present disclosure and executed by a processing circuitry in the apparatus. For example, these computer program instructions may direct the example main controller component described above in connection with at least FIG. 3 and FIG. 4 and/or the example audio controller component described above in connection with at least FIG. 3 and FIG. 4 to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 13:
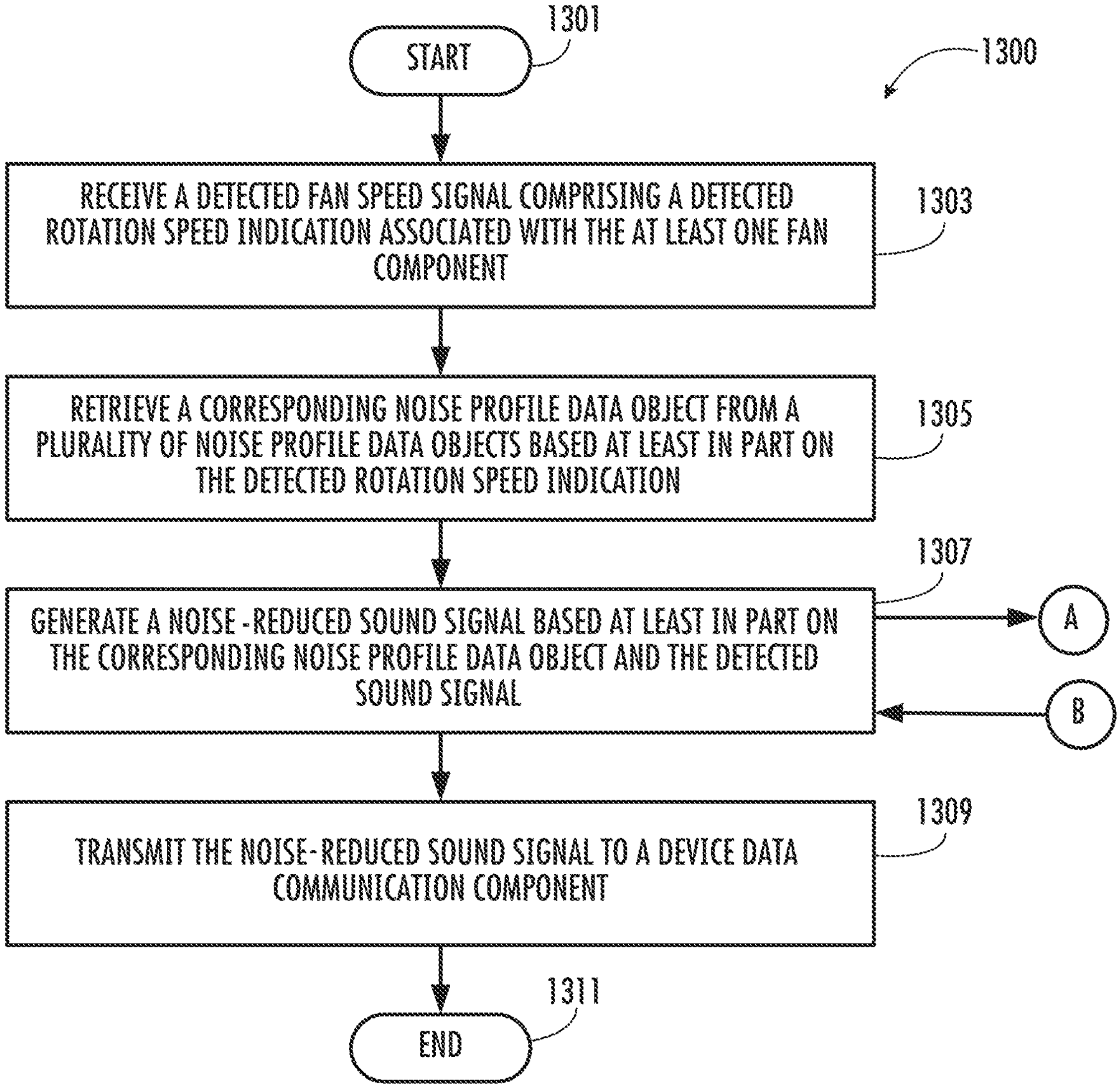
FIG. 13 provides an example diagram illustrating an example method in accordance with some embodiments of the present disclosure.

Referring now to FIG. 13, an example flow diagram illustrating an example method 1300 in accordance with some embodiments of the present disclosure is provided. In particular, FIG. 13 illustrates examples of noise reduction during runtime.

In FIG. 13, the example method 1300 starts at step/operation 1301. In some embodiments, subsequent to and/or in response to step/operation 1301, the example method 1300 proceeds to step/operation 1303. At step/operation 1303, a controller (such as, but not limited to, the example main controller component described above in connection with at least FIG. 3 and FIG. 4, and/or the example audio controller component described above in connection with at least FIG. 3 and FIG. 4) may receive a detected fan speed signal comprising a detected rotation speed indication associated with the at least one fan component.

In some embodiments, the controller may transmit one or more control signals to the at least one fan component, indicating a request for the current rotation speed of the fan component. In some embodiments, in response to receiving the one or more control signals, the at least one fan component transmits one or more detected fan speed signals associated with the at least one fan component. As described above, each of the one or more detected fan speed signals comprises a detected rotation speed indication that indicates a current rotation speed associated with one of the at least one fan component.

Referring back to FIG. 13, subsequent to step/operation 1303, the example method 1300 proceeds to step/operation 1305. At step/operation 1305, a controller (such as, but not limited to, the example main controller component described above in connection with at least FIG. 3 and FIG. 4, and/or the example audio controller component described above in connection with at least FIG. 3 and FIG. 4) may retrieve a corresponding noise profile data object from a plurality of noise profile data objects based at least in part on the detected rotation speed indication.

In the present discourse, the term "noise profile data object" refers to a data object that comprises data and/or information associated with the noise of at least one fan component of the example respiratory protective device when the at least one fan component operates at one or more particular speed.

For example, an example noise profile data object may comprise spectrogram data representing noises from fan components of an example respiratory protective device when the fan components operate at a particular rotation speed. In such an example, the spectrogram data associated with the example noise profile data object may include data and/or information such as, but not limited to, one or more frequency band indications associated with the spectrogram data, one or more threshold sensitivity indications associated with the one or more frequency band indications, and/or the like. For example, an example noise profile data object in accordance with some embodiments of the present disclosure may be represented as the following example array:

Noise Profile N[Speed, Sensitivity, FB1, FB2, FB3, . . . ]

In the above example, "Noise Profile N" represents a Nth noise profile data object, "Speed" represents a detected rotation speed indication associated with the Nth noise profile data object, "FB1" represents the first frequency band indication, "FB2" represents the second frequency band indication, "FB3" represents the third frequency band indication, and "Sensitivity" represents a threshold sensitivity indication. Additional details associated with noise profile data objects are described herein, including, but not limited to, those described in connection with at least FIG. 17 to FIG. 22.

As described above, the example controller may generate a plurality of noise profile data objects, and each of the plurality of noise profile data objects is associated with one of a plurality of rotation speed indications associated with the fan component. For example, the plurality of noise profile data objects may comprise a noise profile data object that includes spectrogram data representing noises from fan components when the fan components operate at 95% PWM (for example, based on FIG. 9A to FIG. 9C as described above). Additionally, or alternatively, the plurality of noise profile data objects may comprise a noise profile data object that includes spectrogram data representing noises from fan components when the fan components operate at 65% PWM (for example, based on FIG. 10A to FIG. 10C as described above). Additionally, or alternatively, the plurality of noise profile data objects may comprise a noise profile data object that includes spectrogram data representing noises from fan components when the fan components operate at 35% PWM (for example, based on FIG. 11A to FIG. 11C as described above).

In some embodiments, the plurality of noise profile data objects are generated prior to receiving the detected fan speed signal at step/operation 1303. For example, the noise profile data objects may be generated as the last step of manufacturing the example respiratory protective device. In some embodiments, the noise profile data objects may be stored in a data storage component (such as, but not limited to, the memory 315 of the main controller component 311 and/or the memory 325 of the audio controller component 321 described above in connection with FIG. 3).

In some embodiments, the controller retrieves the corresponding noise profile data object from a plurality of noise profile data objects based on the detected rotation speed indication. As an example, if the detected rotation speed indication indicates a speed of 95% PWM, the controller retrieves a noise profile data object from the plurality of noise profile data objects in the data storage component that is associated with the speed of 95% PWM.

While the description above provides an example of a noise profile data object, it is noted that the scope of the present disclosure is not limited to the description above. In some examples, an example noise profile data object may comprise one or more additional and/or alternative data and/or information.

Referring back to FIG. 13, subsequent to step/operation 1305, the example method 1300 proceeds to step/operation 1307. At step/operation 1307, a controller (such as, but not limited to, the example main controller component described above in connection with at least FIG. 3 and FIG. 4, and/or the example audio controller component described above in connection with at least FIG. 3 and FIG. 4) may generate a noise-reduced sound signal based at least in part on the corresponding noise profile data object and the detected sound signal.

As described above, the corresponding noise profile data object is retrieved based on the detected rotation speed indication. As such, the corresponding noise profile data object comprises spectrogram data representing noises from fan components when the fan components operate at the current speed. Because the corresponding noise profile data object is pre-generated prior to runtime, the controller does not need to perform noise spectral estimation at runtime, therefore providing technical advantages and benefits such as, but not limited to, faster response in noise reduction. Additional details associated with generating the noise-reduced sound signal are described herein, including, but not limited to, those described in connection with at least FIG. 14.

Referring back to FIG. 13, subsequent to step/operation 1307, the example method 1300 proceeds to step/operation 1309. At step/operation 1309, a controller (such as, but not limited to, the example main controller component described above in connection with at least FIG. 3 and FIG. 4, and/or the example audio controller component described above in connection with at least FIG. 3 and FIG. 4) may transmit the noise-reduced sound signal to a data communication component.

As an example, the audio controller component 321 described above in connection with FIG. 3 may transmit the noise-reduced sound signal to the data communication component 319. In such an example, the data communication component 319 may transmit the noise-reduced sound signal to a telephone device (for example, a smart phone), and the telephone device may provide noise-reduced sound signal as the output voice signal for a telephone call.

Referring back to FIG. 13, subsequent to step/operation 1309, the example method 1300 proceeds to step/operation 1311 and ends.

Figure 14:
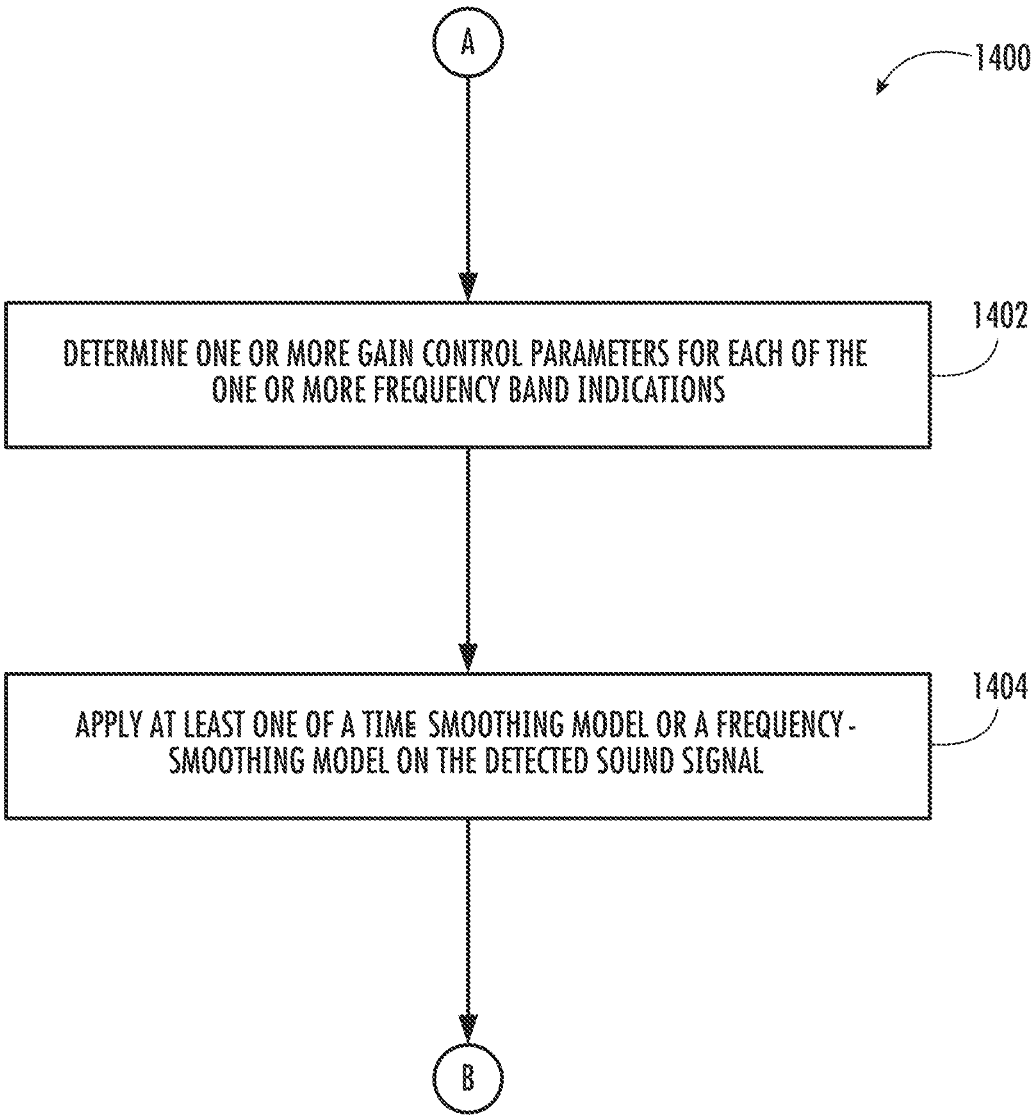
FIG. 14 provides an example diagram illustrating an example method in accordance with some embodiments of the present disclosure.

Referring now to FIG. 14, an example method 1400 of operating an example respiratory protective device in accordance with some example embodiments described herein is illustrated. In particular, FIG. 14 illustrates an example of generating a noise-reduced sound signal based at least in part on the corresponding noise profile data object and the detected sound signal in accordance with some embodiments of the present disclosure.

In FIG. 14 the example method 1400 starts at block A, which connects from step/operation 1307 of FIG. 13. In some embodiments, subsequent to and/or in response to block A, the example method 1400 proceeds to step/operation 1402. At step/operation 1402, a controller (such as, but not limited to, the example main controller component described above in connection with at least FIG. 3 and FIG. 4, and/or the example audio controller component described above in connection with at least FIG. 3 and FIG. 4) may determine one or more gain control parameters for each of the one or more frequency band indications.

As described above in connection with FIG. 13, the corresponding noise profile data object comprises a rotation speed indication, one or more threshold sensitivity indications, and one or more frequency band indications. In particular, the rotation speed indication indicates a speed of the fan component when the noise from the fan component is captured by the noise profile data object. Each of the frequency band indications represents a frequency band associated with the noise from the fan component (e.g., a portion of the noise in the frequency band). Each of the one or more threshold sensitivity indications indicates a threshold level/amplitude of a signal associated with a frequency band that is required for triggering elimination of at least a portion of the signal as noise through spectral gating.

For example, the controller may determine the one or more threshold sensitivity indications from the corresponding noise profile data object, and may implement spectral gating on the detected sound signal based on the one or more threshold sensitivity indications. In such an example, the spectral gating removes noise associated with the one or more fan components from the detected sound signal.

In some embodiments, subsequent to implementing spectral gating, the controller may set a gain control parameter for each of the one or more frequency bands of the one or more frequency band indications associated with the detected sound signal. In the present disclosure, the term "gain control parameter" refers to a signal processing parameter that indicates the amount of gain associated with the signal. For example, the higher the gain, the stronger/louder the signal. In some embodiments, the controller sets the gain controller parameter for each frequency band so that the voice portion of the signal is stronger/louder in the noise-reduced sound signal.

Referring back to FIG. 14, subsequent to step/operation 1402, the example method 1400 proceeds to step/operation 1404. At step/operation 1404, a controller (such as, but not limited to, the example main controller component described above in connection with at least FIG. 3 and FIG. 4, and/or the example audio controller component described above in connection with at least FIG. 3 and FIG. 4) may apply at least one of a time-smoothing model or a frequency-smoothing model on the detected sound signal.

In some embodiments, the "time-smoothing model" is a signal processing model that reduces abnormalities/variations of the signal (e.g., "smooth") in the time domain.

Example time-smoothing models include, but not limited to, moving average models (e.g., by calculating the moving average of the signal in the time domain), exponential models (e.g., by using the exponential window function on the signal), and/or the like.

In some embodiments, the "frequency-smoothing model" is a signal processing model that reduces abnormalities/variations of the signal (e.g., "smooth") in the frequency domain. Example frequency-smoothing models include, but not limited to, low-pass filters, high-pass filters, and/or the like.

As such, by applying at least one of a time-smoothing model or a frequency-smoothing model on the detected sound signal, the controller can reduce the abnormalities and variations in the noise-reduced sound signal in the time domain and/or in the frequency domain.

Referring back to FIG. 14, subsequent to step/operation 1404, the example method 1400 proceeds to block B. Referring back to FIG. 13, block B connects back to step/operation 1307.

Figure 15:
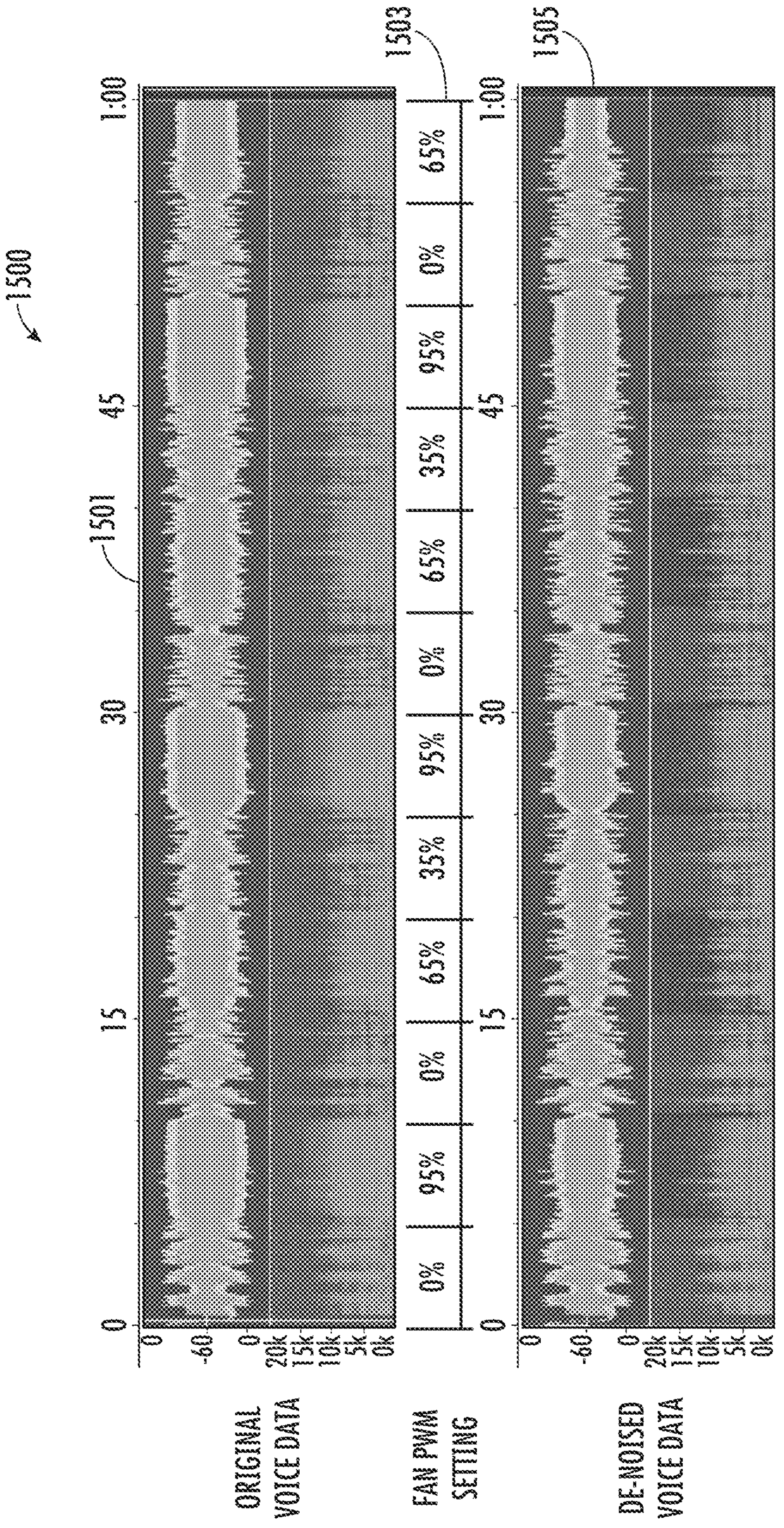
FIG. 15 provides an example diagram illustrating example detected sound signals and example noise-reduced sound signals associated with an example respiratory protective device in the forms of example waveforms and example spectrograms relative to example fan speed signals.

Referring now to FIG. 15, an example diagram 1500 is provided. In particular, the example diagram 1500 illustrates an example comparison between example detected sound signals 1501 (in the forms of example waveforms and example spectrograms) and example noise-reduced sound signals 1505 (in the forms of example waveforms and example spectrograms) relative to example rotation speed indications 1503 from fan speed signals.

In particular, the example detected sound signals 1501 are the raw signals detected by the sound sensor component of the respiratory protective device. The example noise-reduced sound signals 1505 are sound signals with noise reduced that are generated in accordance with some embodiments of the present disclosure. As shown in FIG. 15, various embodiments of the present disclosure provide technical benefits and advantages such as, but not limited to, improved noise reduction and voice quality from the sound signals detected by the sound sensor component, such that the sound sensor component can provide much better, clearer voice of the user for telephone calls.

Referring now to FIG. 16 to FIG. 19, example diagrams and flowcharts illustrating example methods associated with generating noise profile data objects in accordance with some embodiments of the present disclosure are provided.

Figure 16:
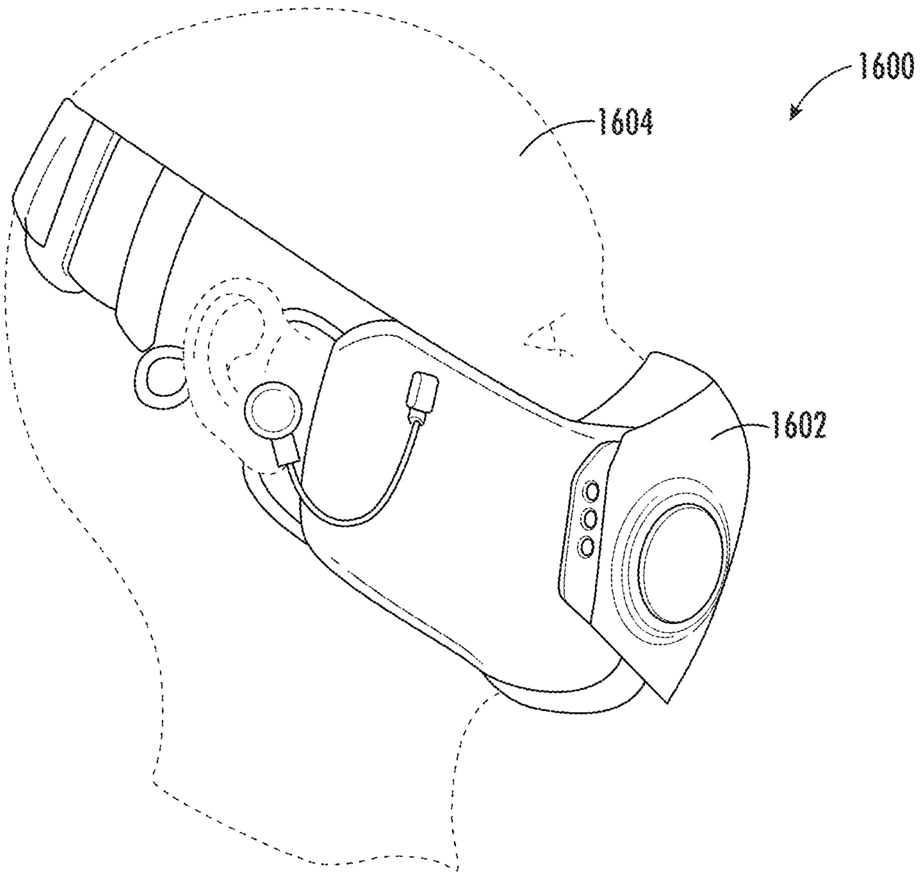
FIG. 16 provides an example diagram illustrates an example respiratory protective device worn by an example head model in accordance with some embodiments of the present disclosure.

FIG. 16 provides an example diagram 1600 illustrating an example respiratory protective device 1602 worn by an example head model 1604.

In particular, the example head model 1604 is a mannequin of a human head. When the example respiratory protective device 1602 is worn by the example head model 1604, the controller component (for example, the main controller component and/or the audio controller component) of the example respiratory protective device 1602 may trigger the one or more fan components to operate at different speeds. Because the example head model 1604 is not breathing, the sound sensor component of the example respiratory protective device 1602 can generate sound signals that represent the noises from the one or more fan components (e.g., without noises from the user's breathing). In some embodiments, based on the sound signals, the controller component may generate a plurality of noise profile data objects, details of which are described in connection with at least FIG. 17 to FIG. 19.

Figure 17:
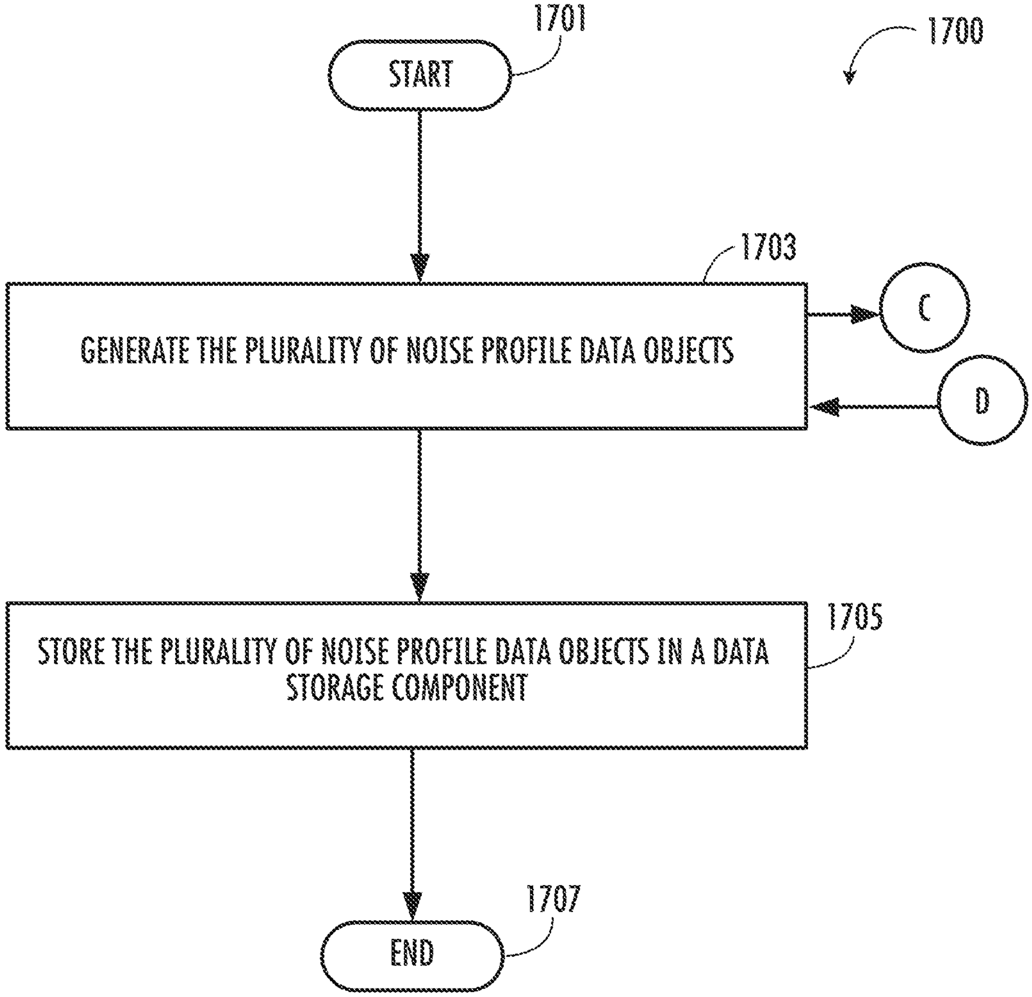
FIG. 17 provides an example diagram illustrating an example method in accordance with some embodiments of the present disclosure.

Referring now to FIG. 17, an example method 1700 of operating an example respiratory protective device in accordance with some example embodiments described herein is illustrated.

In FIG. 17, the example method 1700 starts at step/operation 1701. In some embodiments, subsequent to and/or in response to step/operation 1701, the example method 1700 proceeds to step/operation 1703. At step/operation 1703, a controller (such as, but not limited to, the example main controller component described above in connection with at least FIG. 3 and FIG. 4, and/or the example audio controller component described above in connection with at least FIG. 3 and FIG. 4) may generate the plurality of noise profile data objects.

In some embodiments, each of the plurality of noise profile data objects is associated with one of a rotation speed indication (such as, but not limited to, 20% PWM, 40% PWM, 60% PWM, 80% PWM, and 100% PWM).

In some embodiments, the controller may generate the plurality of noise profile data objects prior to the example respiratory protective device is in use. As described above, the noise profile data objects may be generated as one of the steps for manufacturing the example respiratory protective device. Additional details associated with generating the plurality of noise profile data objects are described herein, including, but not limited to, those described in connection with at least FIG. 18 and FIG. 19.

Referring back to FIG. 17, subsequent to step/operation 1703, the example method 1700 proceeds to step/operation 1705. At step/operation 1705, a controller (such as, but not limited to, the example main controller component described above in connection with at least FIG. 3 and FIG. 4, and/or the example audio controller component described above in connection with at least FIG. 3 and FIG. 4) may store the plurality of noise profile data objects in a data storage component.

In some embodiments, the controller may store the plurality of noise profile data objects in a data storage component on the respiratory protective device. For example, the controller may store the plurality of noise profile data objects in the memory 315 of the main controller component 311 described above in connection with FIG. 3. Additionally, or alternatively, the controller may store the plurality of noise profile data objects in the memory 325 of the audio controller component 321 described above in connection with FIG. 3.

Referring back to FIG. 17, subsequent to step/operation 1705, the example method 1700 proceeds to step/operation 1707 and ends.

Figure 18:
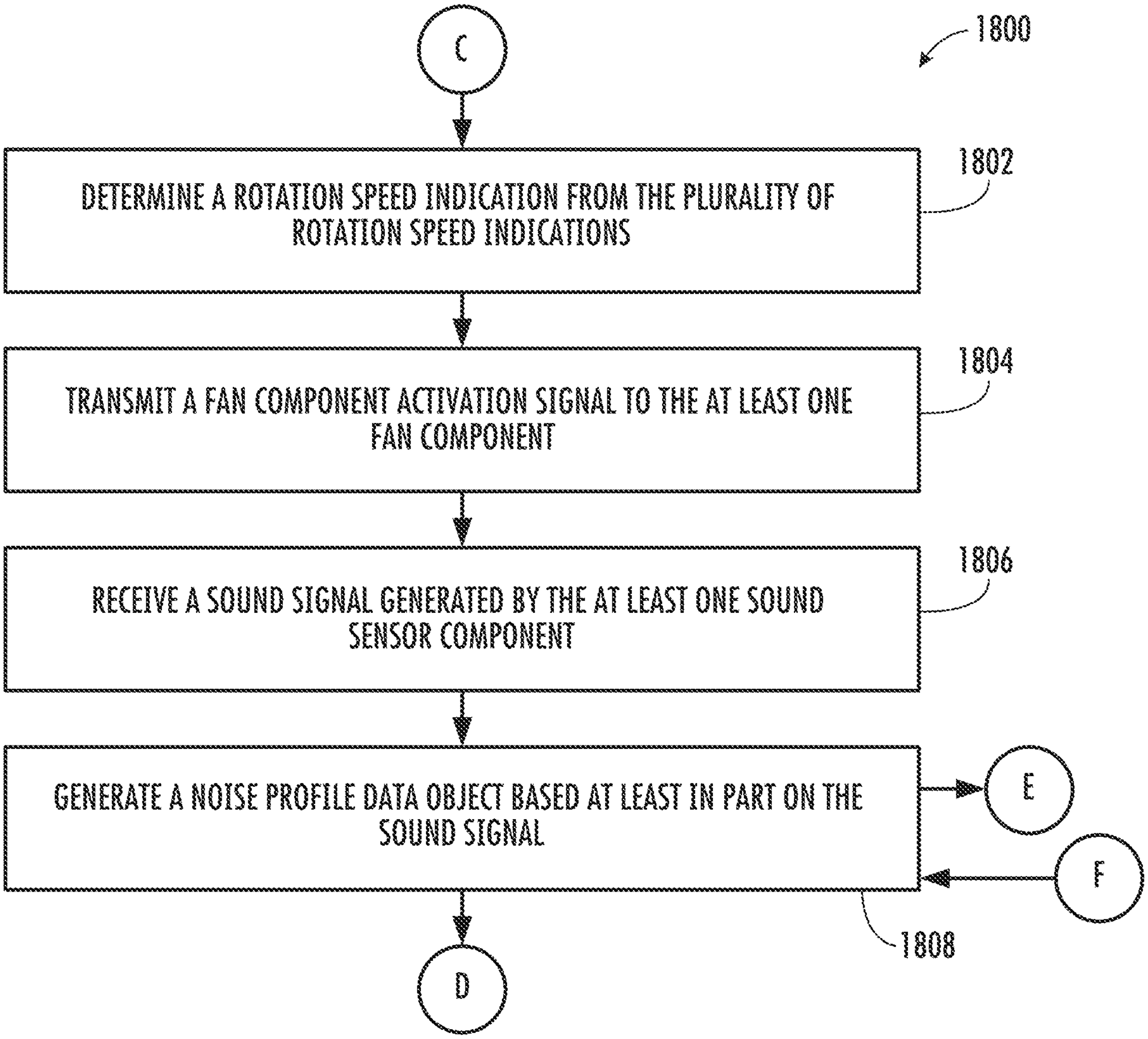
FIG. 18 provides an example diagram illustrating an example method in accordance with some embodiments of the present disclosure.

Referring now to FIG. 18, an example method 1800 of operating an example respiratory protective device in accordance with some example embodiments described herein is illustrated. In particular, the example method 1800 illustrates an example of generating a noise profile data object in accordance with some embodiments of the present disclosure.

In FIG. 18, the example method 1800 starts at block C, which connects to step/operation 1703 of FIG. 17. In some embodiments, subsequent to and/or in response to block C, the example method 1800 proceeds to step/operation 1802. At step/operation 1802, a controller (such as, but not limited to, the example main controller component described above in connection with at least FIG. 3 and FIG. 4, and/or the example audio controller component described above in connection with at least FIG. 3 and FIG. 4) may determine a rotation speed indication from the plurality of rotation speed indications.

As described above, example fan components of an example respiratory protective device in accordance with some embodiments of the present disclosure may operate at various rotation speeds (such as, but not limited to, 20%

PWM, 35% PWM, 65% PWM, 95% PWM, 100% PWM, and/or the like). In some embodiments, the controller selects one of the rotation speeds at step/operation 1802.

For example, the controller may select a rotation speed associated with the fan component that is triggered by an inhalation of the user. Additionally, or alternatively, the controller may select a rotation speed associated with the fan component that is triggered by an exhalation of the user.

In some embodiments, subsequent to and/or in response to step/operation 1802, the example method 1800 proceeds to step/operation 1804. At step/operation 1804, a controller (such as, but not limited to, the example main controller component described above in connection with at least FIG. 3 and FIG. 4, and/or the example audio controller component described above in connection with at least FIG. 3 and FIG. 4) may transmit a fan component activation signal to the at least one fan component.

In some embodiments, the fan component activation signal comprises the rotation speed indication determined at step/operation 1802. In some embodiments, upon receiving the fan component activation signal, the fan component operates at the speed indicated by the rotation speed indication.

In some embodiments, subsequent to and/or in response to step/operation 1804, the example method 1800 proceeds to step/operation 1806. At step/operation 1806, a controller (such as, but not limited to, the example main controller component described above in connection with at least FIG. 3 and FIG. 4, and/or the example audio controller component described above in connection with at least FIG. 3 and FIG. 4) receives a sound signal generated by the at least one sound sensor component.

In some embodiments, the sound signal captures the noise from the one or more fan components when the fan components operate at the speed determined by the controller at step/operation 1802. In some embodiments, the sound signal does not include any sound other than the noise from the one or more fan components.

In some embodiments, subsequent to and/or in response to step/operation 1806, the example method 1800 proceeds to step/operation 1808. At step/operation 1808, a controller (such as, but not limited to, the example main controller component described above in connection with at least FIG. 3 and FIG. 4, and/or the example audio controller component described above in connection with at least FIG. 3 and FIG. 4) may generate a noise profile data object based at least in part on the sound signal.

In some embodiments, based on the sound signal, the controller determines the one or more frequency band indications associated with the sound signal and one or more threshold sensitivity indications associated with each of the one or more frequency band indications. In some embodiments, the controller generates the noise profile data object comprising the rotation speed indication determined at step/operation 1802, as well as the one or more frequency band indications and the one or more threshold sensitivity indications. Additional details associated with generating the noise profile data object are described herein, including, but not limited to, those described in connection with at least FIG. 19.

In some embodiments, subsequent to and/or in response to step/operation 1808, the example method 1800 proceeds to block D. Referring back to FIG. 17, block D connects back to step/operation 1703.

Figure 19:
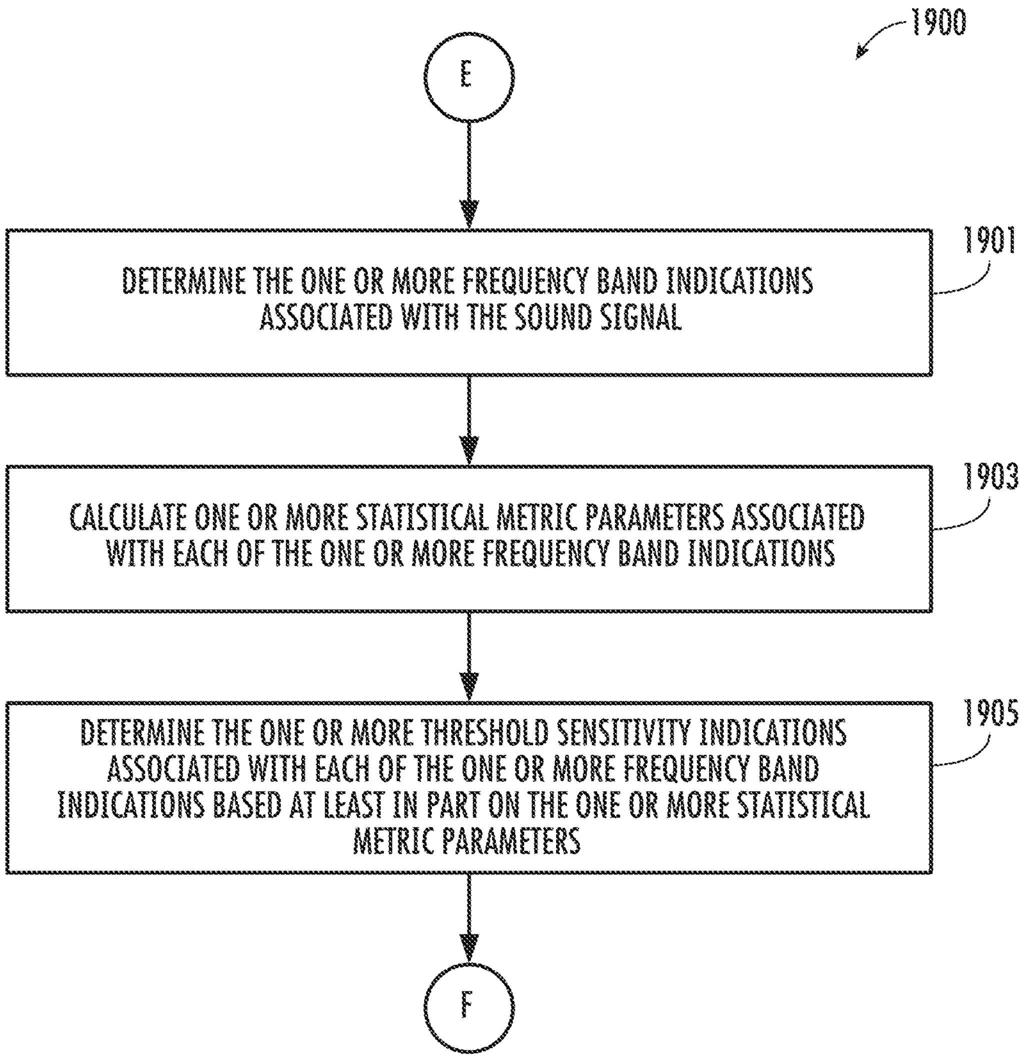
FIG. 19 provides an example diagram illustrating an example method in accordance with some embodiments of the present disclosure.

Referring now to FIG. 19, an example method 1900 of operating an example respiratory protective device in accordance with some example embodiments described herein is illustrated. In particular, FIG. 19 illustrates an example of generating an example noise profile data object in accordance with some embodiments of the present disclosure.

In FIG. 19, the example method 1900 starts at block E, which connects to step/operation 1808 of FIG. 18. In some embodiments, subsequent to and/or in response to block E, the example method 1900 proceeds to step/operation 1901. At step/operation 1901, a controller (such as, but not limited to, the example main controller component described above in connection with at least FIG. 3 and FIG. 4, and/or the example audio controller component described above in connection with at least FIG. 3 and FIG. 4) may determine the one or more frequency band indications associated with the sound signal.

For example, the sound signal may be generated by a sound sensor component, similar to those described above in connection with at least step/operation 1806 of FIG. 18. In some embodiments, the controller applies fast Fourier transform (FFT) on the received sound signal using a Hann window to determine the one or more frequency band indications associated with the sound signal at step/operation 1901.

While the description above provides an example of determining the one or more frequency band indications associated with the sound signal, it is noted that the scope of the present disclosure is not limited to the description above. In some embodiments, an example method may determine the one or more frequency band indications based on one or more additional and/or alternative means.

In some embodiments, subsequent to and/or in response to step/operation 1901, the example method 1900 proceeds to step/operation 1903. At step/operation 1903, a controller (such as, but not limited to, the example main controller component described above in connection with at least FIG. 3 and FIG. 4, and/or the example audio controller component described above in connection with at least FIG. 3 and FIG. 4) may calculate one or more statistical metric parameters associated with each of the one or more frequency band indications.

For example, the controller may calculate statistical metric parameters such as, but not limited to, the means, the power, and/or the like of the sound signal. In some embodiments, the controller may calculate statistical metric parameters of the sound signal in each of the one or more frequency bands as indicated by the one or more frequency band indications determined at step/operation 1901.

While the description above provides example statistical metric parameters, it is noted that the scope of the present disclosure is not limited to the description above. In some examples, an example method may calculate one or more additional and/or alternative statistical metric parameters.

In some embodiments, subsequent to and/or in response to step/operation 1903, the example method 1900 proceeds to step/operation 1905. At step/operation 1905, a controller (such as, but not limited to, the example main controller component described above in connection with at least FIG. 3 and FIG. 4, and/or the example audio controller component described above in connection with at least FIG. 3 and FIG. 4) may determine the one or more threshold sensitivity indications associated with each of the one or more frequency band indications based at least in part on the one or more statistical metric parameters.

As described above, each of the one or more threshold sensitivity indications indicates a threshold level of a sound signal associated with a frequency band that is required for triggering elimination of at least a portion of the sound signal as noise through spectral gating. In some embodiments, the controller may set the one or more threshold sensitivity indications based at least in part on the one or more statistical metric parameters 1903.

For example, the controller may set the threshold sensitivity indication based on a mean of the sound signal in a frequency band, a power of the sound signal in the frequency band, and/or the like. While the description above provides example statistical metric parameters, it is noted that the scope of the present disclosure is not limited to the description above. In some examples, an example method may determine the one or more threshold sensitivity indications based on one or more additional and/or alternative statistical metric parameters.

Referring back to FIG. 19, in some embodiments, subsequent to and/or in response to step/operation 1905, the example method 1900 proceeds to block F. As illustrated above in connection with FIG. 18, block F connects back to step/operation 1808 of FIG. 18.

Figure 20:
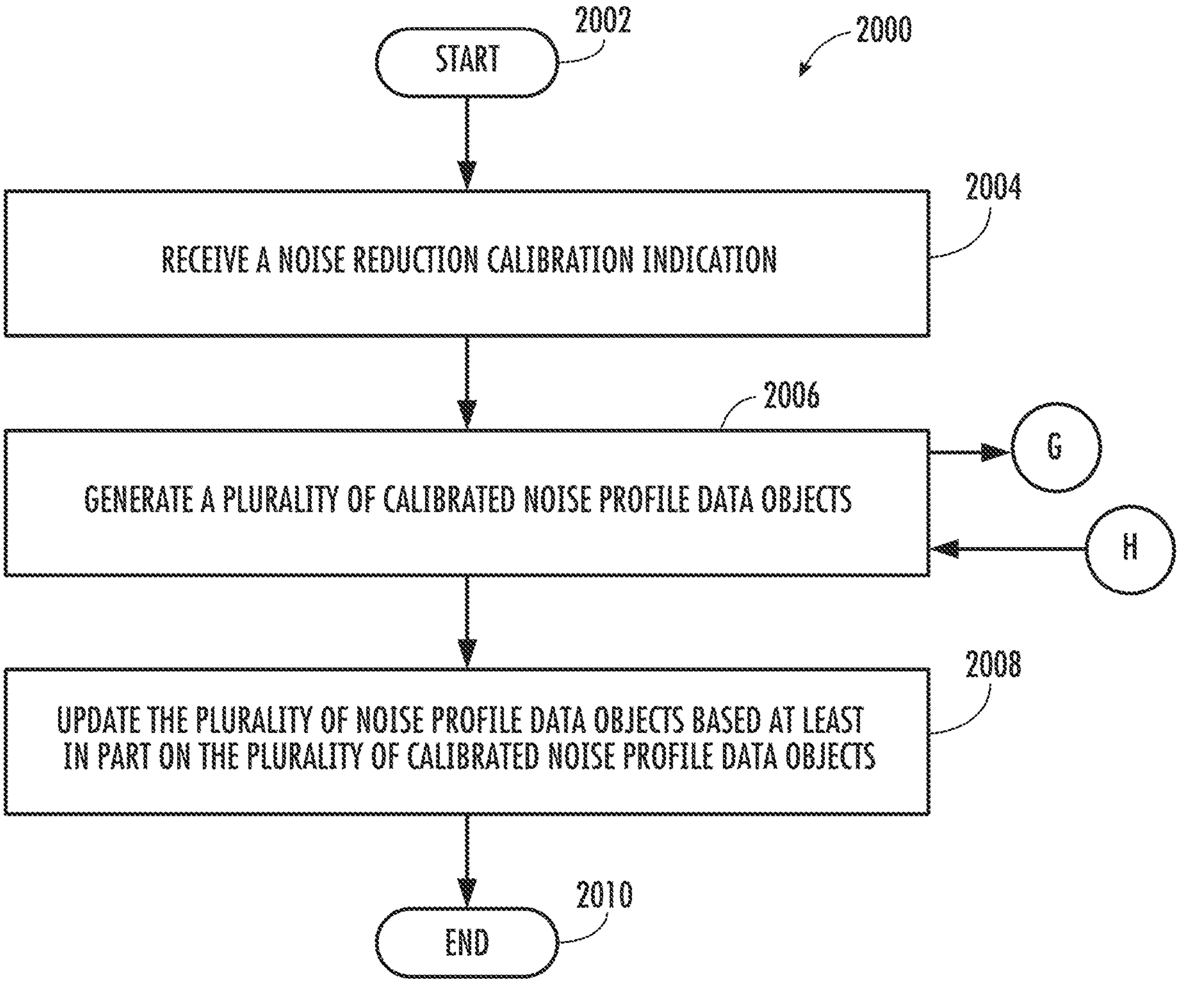
FIG. 20 provides an example diagram illustrating an example method in accordance with some embodiments of the present disclosure.
Figure 21:
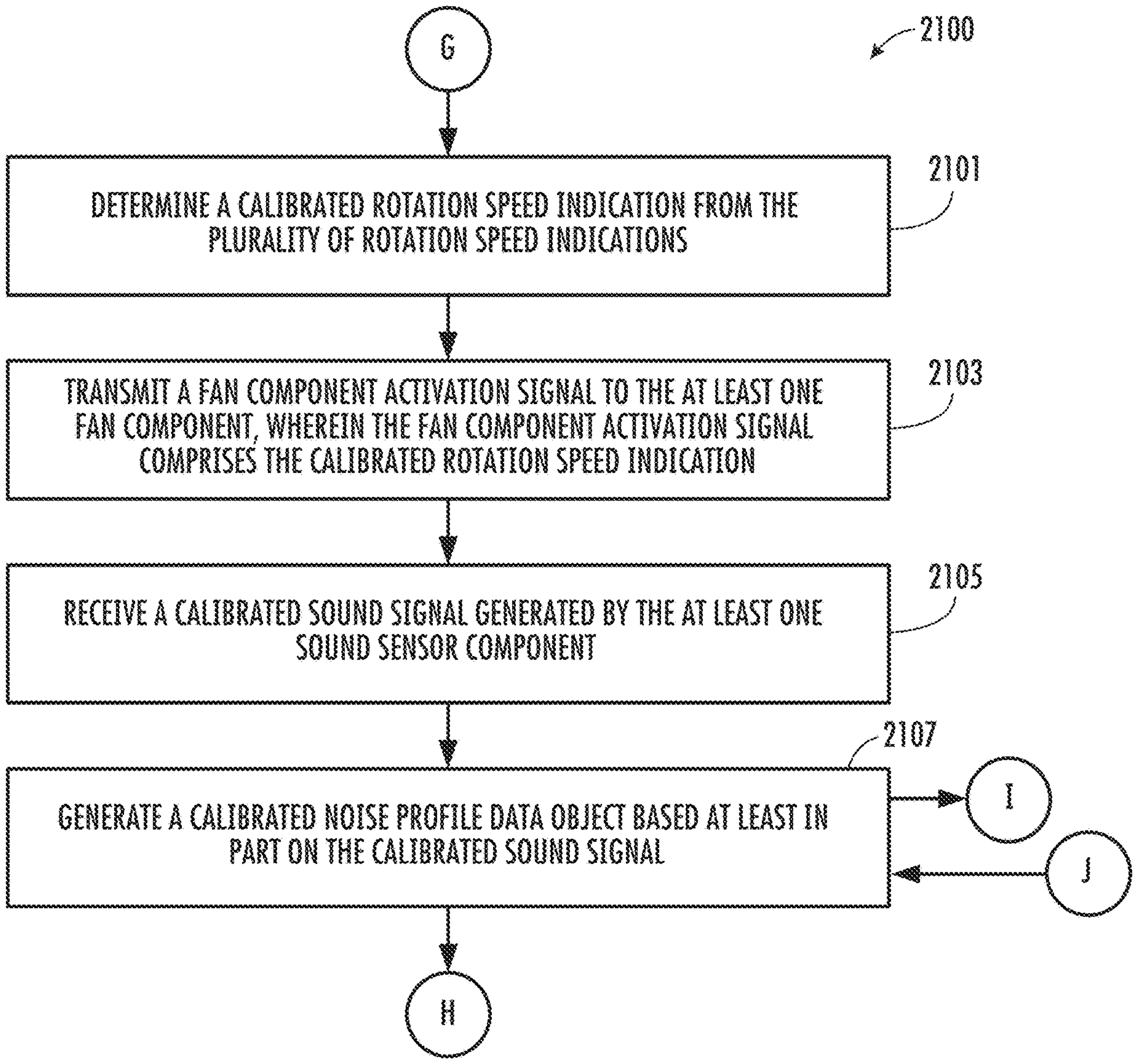
FIG. 21 provides an example diagram illustrating an example method in accordance with some embodiments of the present disclosure.
Figure 22:
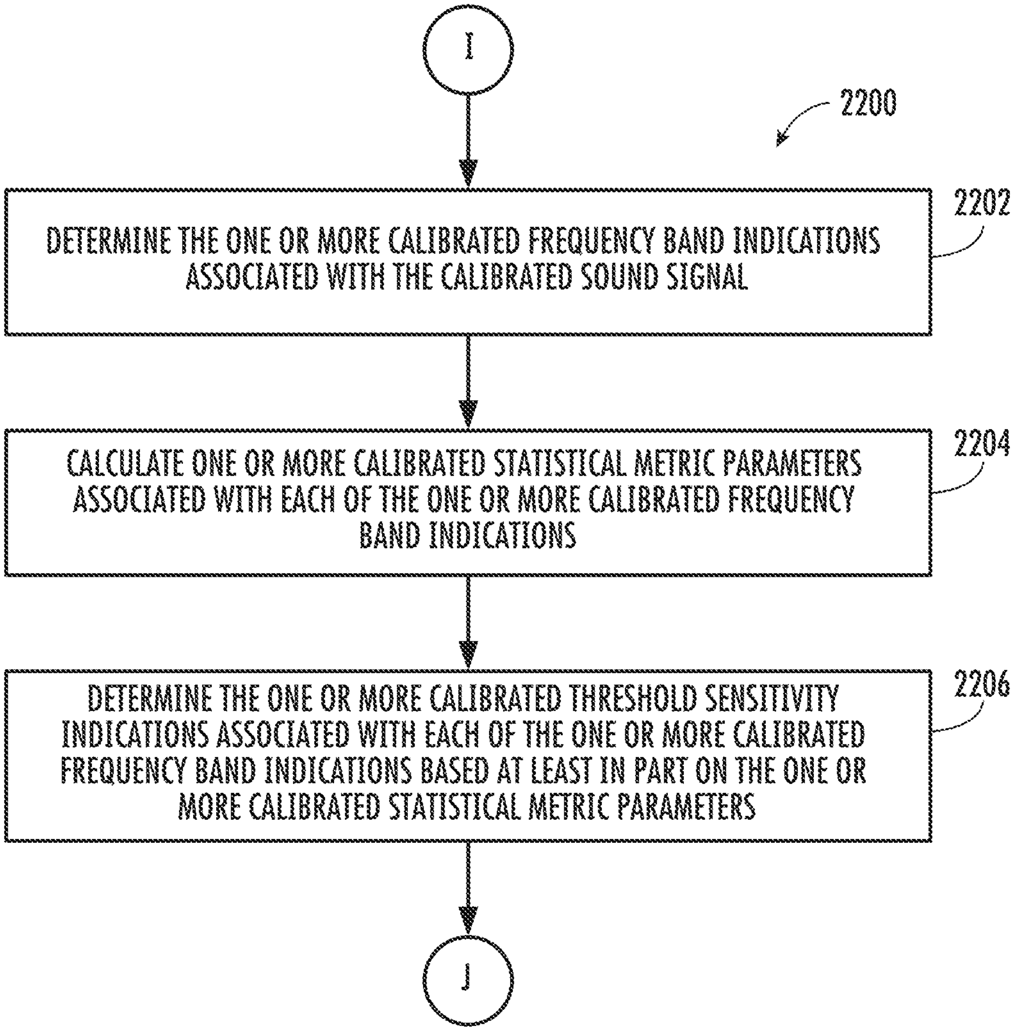
FIG. 22 provides an example diagram illustrating an example method in accordance with some embodiments of the present disclosure.

Referring now to FIG. 20 to FIG. 22, example methods associated with calibrating and/or updating noise profile data objects in accordance with some embodiments of the present disclosure are provided.

Referring now to FIG. 20, an example method 2000 of calibrating an example respiratory protective device in accordance with some example embodiments described herein is illustrated.

In FIG. 20, the example method 2000 starts at step/operation 2002. In some embodiments, subsequent to and/or in response to step/operation 2002, the example method 2000 proceeds to step/operation 2004. At step/operation 2004, a controller (such as, but not limited to, the example main controller component described above in connection with at least FIG. 3 and FIG. 4, and/or the example audio controller component described above in connection with at least FIG. 3 and FIG. 4) may receive a noise reduction calibration indication.

In the present disclosure, the term "noise reduction calibration indication" refers to an electronic indication from a user to calibrate and/or update the noise profile data objects stored in the respiratory protective device. For example, the user may request calibrating and/or updating the noise profile data objects to avoid noise spectrum drifting.

In some embodiments, the user may provide a noise reduction calibration indication through interacting with one or more components of the respiratory protective device. For example, as described above, an example respiratory protective device may comprise one or more key components. In some embodiments, when the user long presses one of the buttons from the one or more key components (for example, a five second press on the "fan control" button of a key component), the one or more key component may generate a noise reduction calibration indication and transmit the noise reduction calibration indication to trigger a calibration mode.

Referring back to FIG. 20, subsequent to step/operation 2004, the example method 2000 proceeds to step/operation 2006. At step/operation 2006, a controller (such as, but not limited to, the example main controller component described above in connection with at least FIG. 3 and FIG. 4, and/or the example audio controller component described above in connection with at least FIG. 3 and FIG. 4) may generate a plurality of calibrated noise profile data objects associated with the plurality of rotation speed indications.

In some embodiments, each of the plurality of calibrated noise profile data objects is associated with one of the plurality of rotation speed indications. FIG. 21 and FIG. 22 illustrate example methods associated with generating one of the calibrated noise profile data objects in accordance with some embodiments of the present disclosure.

Referring back to FIG. 20, subsequent to step/operation 2006, the example method 2000 proceeds to step/operation 2008. At step/operation 2008, a controller (such as, but not limited to, the example main controller component described above in connection with at least FIG. 3 and FIG. 4, and/or the example audio controller component described above in connection with at least FIG. 3 and FIG. 4) may update the plurality of noise profile data objects based at least in part on the plurality of calibrated noise profile data objects.

For example, the controller may replace the noise profile data objects stored in the data storage component with the calibrated noise profile data objects generated at step/operation 2006.

Referring back to FIG. 20, subsequent to step/operation 2008, the example method 2000 proceeds to step/operation 2010 and ends.

Referring now to FIG. 21, an example method 2100 of operating an example respiratory protective device in accordance with some example embodiments described herein is illustrated. In particular, FIG. 21 illustrates an example method of generating a calibrated noise profile data object in accordance with some embodiments of the present disclosure.

In FIG. 21, the example method 2100 starts at block G, which connects to step/operation 2006 of FIG. 20. In some embodiments, subsequent to and/or in response to block G, the example method 2100 proceeds to step/operation 2101. At step/operation 2101, a controller (such as, but not limited to, the example main controller component described above in connection with at least FIG. 3 and FIG. 4, and/or the example audio controller component described above in connection with at least FIG. 3 and FIG. 4) may determine a calibrated rotation speed indication from the plurality of rotation speed indications.

In some embodiments, the controller determines the calibrated rotation speed indication from the plurality of rotation speed indications similar to determining the rotation speed indication described above in connection with at least step/operation 1802 of FIG. 18.

In some embodiments, subsequent to and/or in response to step/operation 2101, the example method 2100 proceeds to step/operation 2103. At step/operation 2103, a controller (such as, but not limited to, the example main controller component described above in connection with at least FIG. 3 and FIG. 4, and/or the example audio controller component described above in connection with at least FIG. 3 and FIG. 4) may transmit a fan component activation signal to the at least one fan component.

In some embodiments, the fan component activation signal comprises the calibrated rotation speed indication determined at step/operation 2101. In some embodiments, upon receiving the fan component activation signal, the fan component operates at the speed indicated by the calibrated rotation speed indication.

In some embodiments, subsequent to and/or in response to step/operation 2103, the example method 2100 proceeds to step/operation 2105. At step/operation 2105, a controller (such as, but not limited to, the example main controller component described above in connection with at least FIG. 3 and FIG. 4, and/or the example audio controller component described above in connection with at least FIG. 3 and FIG. 4) may receive a calibrated sound signal generated by the at least one sound sensor component.

In some embodiments, the calibrated sound signal captures the noise from the one or more fan components when the fan components operate at the calibrated speed determined by the controller at step/operation 2105. In some embodiments, the calibrated sound signal does not include any sound other than the noise from the one or more fan components.

In some embodiments, subsequent to and/or in response to step/operation 2105, the example method 2100 proceeds to step/operation 2107. At step/operation 2107, a controller (such as, but not limited to, the example main controller component described above in connection with at least FIG. 3 and FIG. 4, and/or the example audio controller component described above in connection with at least FIG. 3 and FIG. 4) may generate a calibrated noise profile data object based at least in part on the calibrated sound signal.

In some embodiments, the calibrated noise profile data object comprises the calibrated rotation speed indication, one or more threshold sensitivity indications, and one or more frequency band indications For example, based on the calibrated sound signal, the controller determines the one or more calibrated frequency band indications associated with the calibrated sound signal and one or more calibrated threshold sensitivity indications associated with each of the calibrated one or more frequency band indications. In some embodiments, the controller generates the calibrated noise profile data object comprising the calibrated rotation speed indication determined at step/operation 2101, as well as the one or more calibrated frequency band indications and the one or more calibrated threshold sensitivity indications. Additional details associated with generating the calibrated noise profile data object are described herein, including, but not limited to, those described in connection with at least FIG. 22.

In some embodiments, subsequent to and/or in response to step/operation 2107, the example method 2100 proceeds to block H, which connects back to step/operation 2006 of FIG. 20.

Referring now to FIG. 22, an example method 2200 of operating an example respiratory protective device in accordance with some example embodiments described herein is illustrated.

In FIG. 22, the example method 2200 starts at block I, which connects to step/operation 2107 of FIG. 21. In some embodiments, subsequent to and/or in response to block I, the example method 2200 proceeds to step/operation 2202. At step/operation 2202, a controller (such as, but not limited to, the example main controller component described above in connection with at least FIG. 3 and FIG. 4, and/or the example audio controller component described above in connection with at least FIG. 3 and FIG. 4) may determine the one or more calibrated frequency band indications associated with the calibrated sound signal.

For example, the calibrated sound signal may be generated by a sound sensor component, similar to those described above in connection with at least step/operation 2105 of FIG. 21. In some embodiments, the controller applies fast Fourier transform (FFT) on the calibrated sound signal using a Hann window to determine the one or more calibrated frequency band indications associated with the calibrated sound signal at step/operation 2202.

While the description above provides an example of determining the one or more calibrated frequency band indications associated with the calibrated sound signal, it is noted that the scope of the present disclosure is not limited to the description above. In some embodiments, an example method may determine the one or more frequency calibrated band indications based on one or more additional and/or alternative means.

In some embodiments, subsequent to and/or in response to step/operation 2202 the example method 2200 proceeds to step/operation 2204. At step/operation 2204, a controller (such as, but not limited to, the example main controller component described above in connection with at least FIG. 3 and FIG. 4, and/or the example audio controller component described above in connection with at least FIG. 3 and FIG. 4) may calculate one or more calibrated statistical metric parameters associated with each of the one or more calibrated frequency band indications.

For example, the controller may calculate calibrated statistical metric parameters such as, but not limited to, the means, the power, and/or the like of the calibrated sound signal. In some embodiments, the controller may calculate calibrated statistical metric parameters of the calibrated sound signal in each of the one or more calibrated frequency bands as indicated by the one or more calibrated frequency band indications determined at step/operation 2202.

While the description above provides example calibrated statistical metric parameters, it is noted that the scope of the present disclosure is not limited to the description above. In some examples, an example method may calculate one or more additional and/or alternative calibrated statistical metric parameters.

In some embodiments, subsequent to and/or in response to step/operation 2204 the example method 2200 proceeds to step/operation 2206. At step/operation 2206, a controller (such as, but not limited to, the example main controller component described above in connection with at least FIG. 3 and FIG. 4, and/or the example audio controller component described above in connection with at least FIG. 3 and FIG. 4) may determine the one or more calibrated threshold sensitivity indications associated with each of the one or more calibrated frequency band indications based at least in part on the one or more calibrated statistical metric parameters.

As described above, each of the one or more calibrated threshold sensitivity indications indicates a threshold level of a calibrated sound signal associated with a calibrated frequency band that is required for triggering elimination of at least a portion of the calibrated sound signal as noise through spectral gating. In some embodiments, the controller may set the one or more calibrated threshold sensitivity indications based at least in part on the one or more calibrated statistical metric parameters 1903.

For example, the controller may set the calibrated threshold sensitivity indication based on a mean of the calibrated sound signal in a frequency band, a power of the calibrated sound signal in the frequency band, and/or the like. While the description above provides example calibrated statistical metric parameters, it is noted that the scope of the present disclosure is not limited to the description above. In some examples, an example method may determine the one or more calibrated threshold sensitivity indications based on one or more additional and/or alternative calibrated statistical metric parameters.

Referring back to FIG. 22, in some embodiments, subsequent to and/or in response to step/operation 2206, the example method 2200 proceeds to block J. As illustrated above in connection with FIG. 21, block J connects back to step/operation 2107 where the controller generate a calibrated noise profile data object (for example, based on the one or more calibrated frequency band indications and the one or more calibrated threshold sensitivity indications described in connection with at least FIG. 22).

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A respiratory protective device comprising:

at least one fan component secured to the respiratory protective device;

at least one sound sensor component positioned within the respiratory protective device and generating a detected sound signal; and a controller component electronically coupled to the at least one fan component, wherein the controller component is configured to:

receive a detected fan speed signal comprising a detected rotation speed indication associated with the at least one fan component;

retrieve, from a data storage component, a corresponding noise profile data object from a plurality of noise profile data objects based at least in part on the detected rotation speed indication;

generate a noise-reduced sound signal based at least in part on the corresponding noise profile data object and the detected sound signal; and transmit the noise-reduced sound signal to a data communication component.

2. The respiratory protective device of claim 1, wherein the respiratory protective device further comprises:

an audio controller component in electronic communication with the at least one sound sensor component and the controller component.

3. The respiratory protective device of claim 2, wherein the audio controller component is configured to:

receive the detected sound signal from the at least one sound sensor component; and transmit the detected sound signal to the controller component.

4. The respiratory protective device of claim 1, wherein the corresponding noise profile data object comprises a rotation speed indication, one or more threshold sensitivity indications, and one or more frequency band indications.

5. The respiratory protective device of claim 4, wherein, when generating the noise-reduced sound signal, the controller component is configured to:

determine one or more gain control parameters for each of the one or more frequency band indications; and apply at least one of a time-smoothing model or a frequency-smoothing model on the detected sound signal.

6. The respiratory protective device of claim 1, wherein each of the plurality of noise profile data objects is associated with one of a plurality of rotation speed indications.

7. The respiratory protective device of claim 6, wherein, prior to receiving the detected fan speed signal, the controller component is configured to:

generate the plurality of noise profile data objects; and store the plurality of noise profile data objects in the data storage component.

8. The respiratory protective device of claim 7, wherein, when generating the plurality of noise profile data objects, the controller component is configured to:

determine a rotation speed indication from the plurality of rotation speed indications;

transmit a fan component activation signal to the at least one fan component, wherein the fan component activation signal comprises the rotation speed indication;

receive a sound signal generated by the at least one sound sensor component; and generate a noise profile data object based at least in part on the sound signal.

9. The respiratory protective device of claim 8, wherein the noise profile data object comprises the rotation speed indication, one or more threshold sensitivity indications, and one or more frequency band indications, wherein, when generating the noise profile data object, the controller component is configured to:

determine the one or more frequency band indications associated with the sound signal;

calculate one or more statistical metric parameters associated with each of the one or more frequency band indications; and determine the one or more threshold sensitivity indications associated with each of the one or more frequency band indications based at least in part on the one or more statistical metric parameters.

10. The respiratory protective device of claim 6, wherein the controller component is configured to:

receive a noise reduction calibration indication;

generate a plurality of calibrated noise profile data objects; and update the plurality of noise profile data objects based at least in part on the plurality of calibrated noise profile data objects.

11. A computer-implemented method comprising:

receiving, by a controller component of a respiratory protective device, a detected fan speed signal comprising a detected rotation speed indication associated with at least one fan component;

retrieving, from a data storage component by the controller component, a corresponding noise profile data object from a plurality of noise profile data objects based at least in part on the detected rotation speed indication;

generating, by the controller component, a noise-reduced sound signal based at least in part on the corresponding noise profile data object and a detected sound signal; and transmitting, by the controller component, the noise-reduced sound signal to a data communication component.

12. The computer-implemented method of claim 11, wherein the respiratory protective device further comprises:

an audio controller component in electronic communication with the controller component.

13. The computer-implemented method of claim 12, further comprising:

receiving, by the audio controller component, the detected sound signal from at least one sound sensor component; and transmitting, by the audio controller component, the detected sound signal to the controller component.

14. The computer-implemented method of claim 11, wherein the corresponding noise profile data object comprises a rotation speed indication, one or more threshold sensitivity indications, and one or more frequency band indications.

15. The computer-implemented method of claim 14, wherein generating the noise-reduced sound signal comprises:

determining, by the controller component, one or more gain control parameters for each of the one or more frequency band indications; and applying, by the controller component, at least one of a time-smoothing model or a frequency-smoothing model on the detected sound signal.

16. The computer-implemented method of claim 11, wherein each of the plurality of noise profile data objects is associated with one of a plurality of rotation speed indications.

17. The computer-implemented method of claim 16, wherein, prior to receiving the detected fan speed signal, the computer-implemented method comprises:

generating, by the controller component, the plurality of noise profile data objects; and storing, by the controller component, the plurality of noise profile data objects in the data storage component.

18. The computer-implemented method of claim 17, wherein generating the plurality of noise profile data objects comprises:

determining, by the controller component, a rotation speed indication from the plurality of rotation speed indications;

transmitting, by the controller component, a fan component activation signal to the at least one fan component, wherein the fan component activation signal comprises the rotation speed indication;

receiving, by the controller component, a sound signal generated by at least one sound sensor component; and generating, by the controller component, a noise profile data object based at least in part on the sound signal.

19. The computer-implemented method of claim 18, wherein the noise profile data object comprises the rotation speed indication, one or more threshold sensitivity indications, and one or more frequency band indications, wherein generating the noise profile data object comprises:

determining, by the controller component, the one or more frequency band indications associated with the sound signal;

calculating, by the controller component, one or more statistical metric parameters associated with each of the one or more frequency band indications; and determining, by the controller component, the one or more threshold sensitivity indications associated with each of the one or more frequency band indications based at least in part on the one or more statistical metric parameters.

20. The computer-implemented method of claim 16, further comprising:

receiving, by the controller component, a noise reduction calibration indication;

generating, by the controller component, a plurality of calibrated noise profile data objects; and updating, by the controller component, the plurality of noise profile data objects based at least in part on the plurality of calibrated noise profile data objects.

21. A respiratory protective device comprising:

at least one fan component secured to the respiratory protective device;

at least one sound sensor component positioned within the respiratory protective device and generating a detected sound signal; and a controller component electronically coupled to the at least one fan component, wherein the controller component is configured to:

generate a plurality of noise profile data objects, wherein each of the plurality of noise profile data objects is associated with one of a plurality of rotation speed indications associated with the at least one fan component;

store the plurality of noise profile data objects in a data storage component;

receive a detected fan speed signal comprising a detected rotation speed indication associated with the at least one fan component;

retrieve, from the data storage component, a corresponding noise profile data object from the plurality of noise profile data objects based at least in part on the detected rotation speed indication;

generate a noise-reduced sound signal based at least in part on the corresponding noise profile data object and the detected sound signal; and transmit the noise-reduced sound signal to a data communication component.

22. A respiratory protective device comprising:

at least one fan component secured to the respiratory protective device;

at least one sound sensor component positioned within the respiratory protective device and generating a detected sound signal; and a controller component electronically coupled to the at least one fan component, wherein the controller component is configured to:

receive a detected fan speed signal comprising a detected rotation speed indication associated with the at least one fan component;

retrieve a corresponding noise profile data object from a plurality of noise profile data objects based at least in part on the detected rotation speed indication, wherein the corresponding noise profile data object comprises a rotation speed indication, one or more threshold sensitivity indications, and one or more frequency band indications;

generate a noise-reduced sound signal based at least in part on the corresponding noise profile data object and the detected sound signal; and transmit the noise-reduced sound signal to a data communication component.

* * * * *